March 7, 1967 J. J. FANNON, JR., ETAL 3,307,529
RADIANT HEATER ARRANGEMENT
Filed Oct. 23, 1964 10 Sheets-Sheet 3

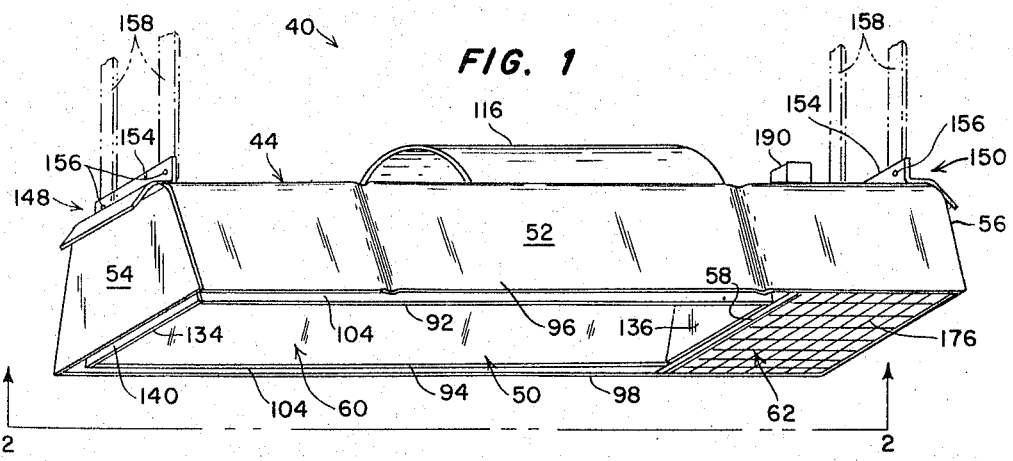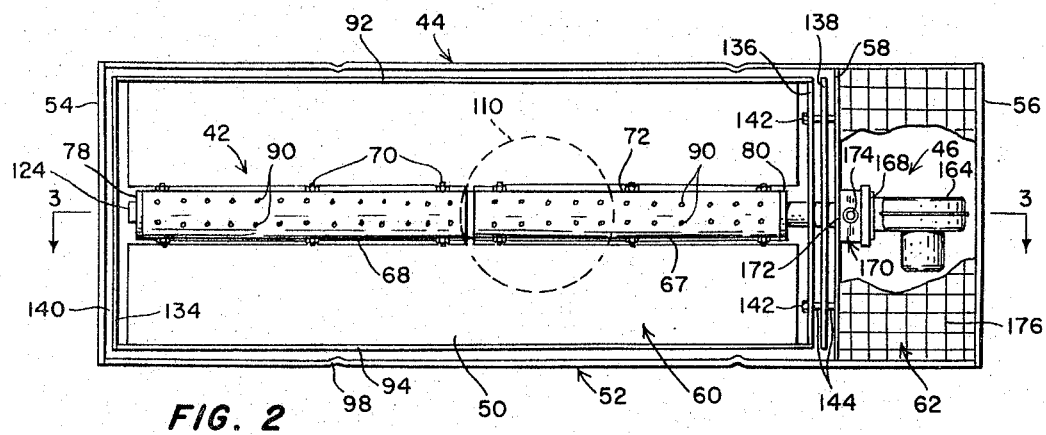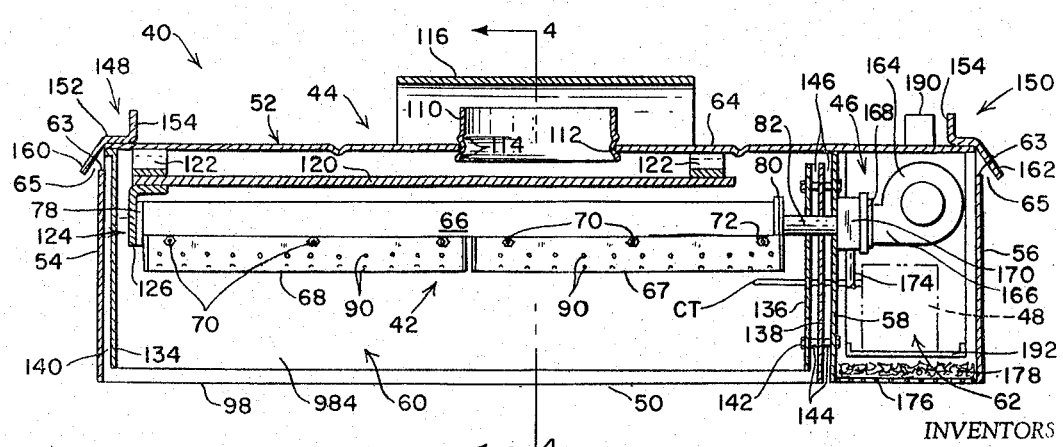

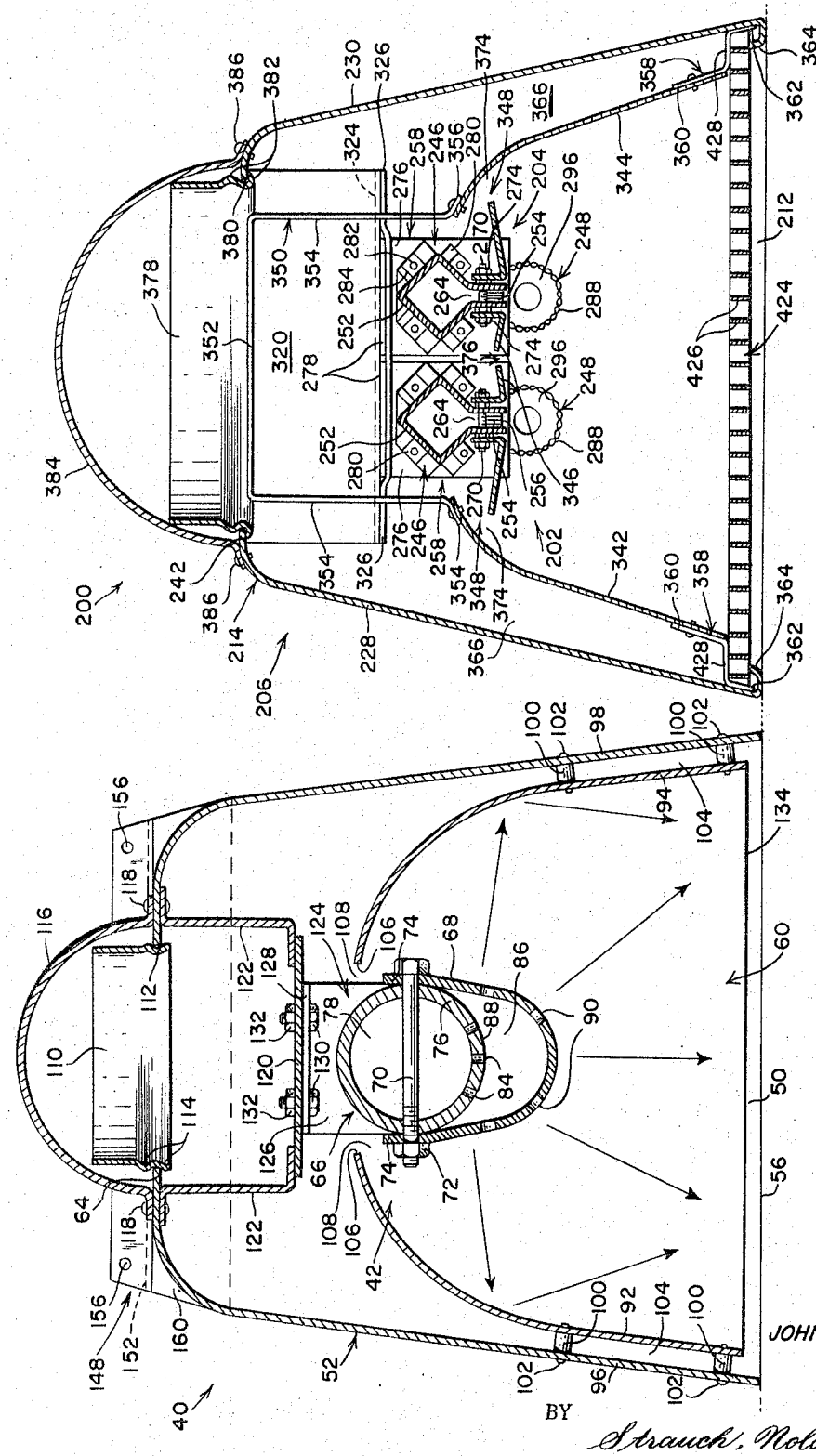

INVENTOR
JOHN J. FANNON, JR.
and MARC RESEK

BY *Strauch, Nolan & Neale*
ATTORNEYS

March 7, 1967 J. J. FANNON, JR., ETAL 3,307,529
RADIANT HEATER ARRANGEMENT
Filed Oct. 23, 1964 10 Sheets-Sheet 4
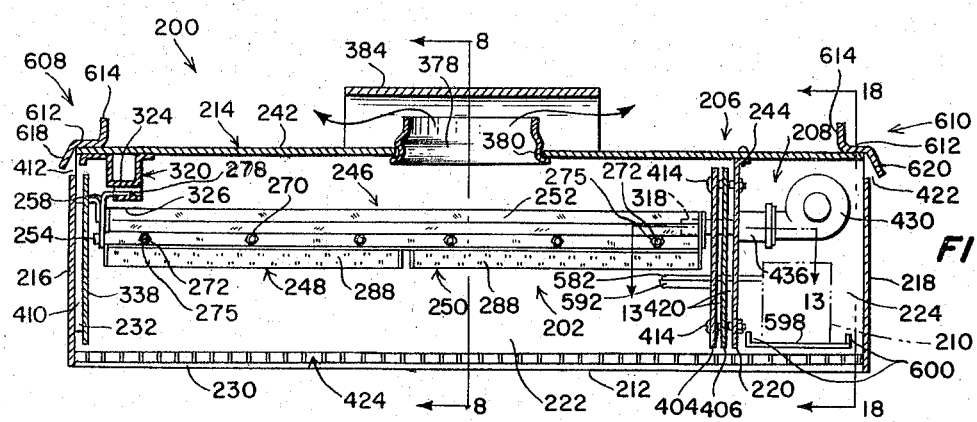
FIG. 9
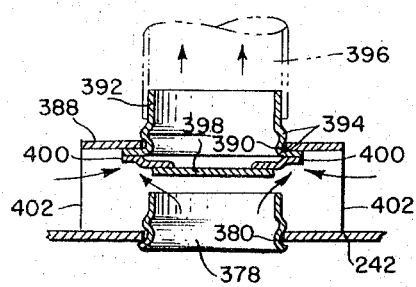
FIG. 10
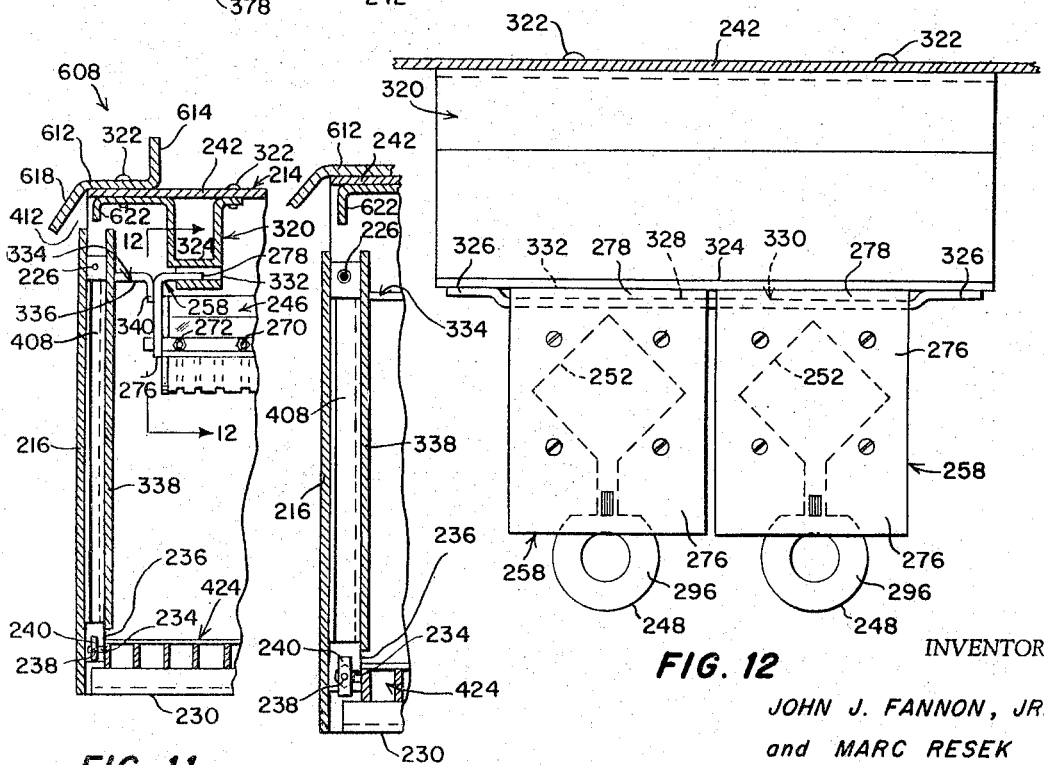
FIG. 11
FIG. 11A
FIG. 12
INVENTOR
JOHN J. FANNON, JR.
and MARC RESEK
BY Strauch, Nolan & Neale
ATTORNEYS March 7, 1967

J. J. FANNON, JR., ET AL 3,307,529

RADIANT HEATER ARRANGEMENT

Filed Oct. 23, 1964

INVENTOR
JOHN J. FANNON, JR.
and MARC RESEK

BY *Strauch, Nolan & Neale*

ATTORNEYS

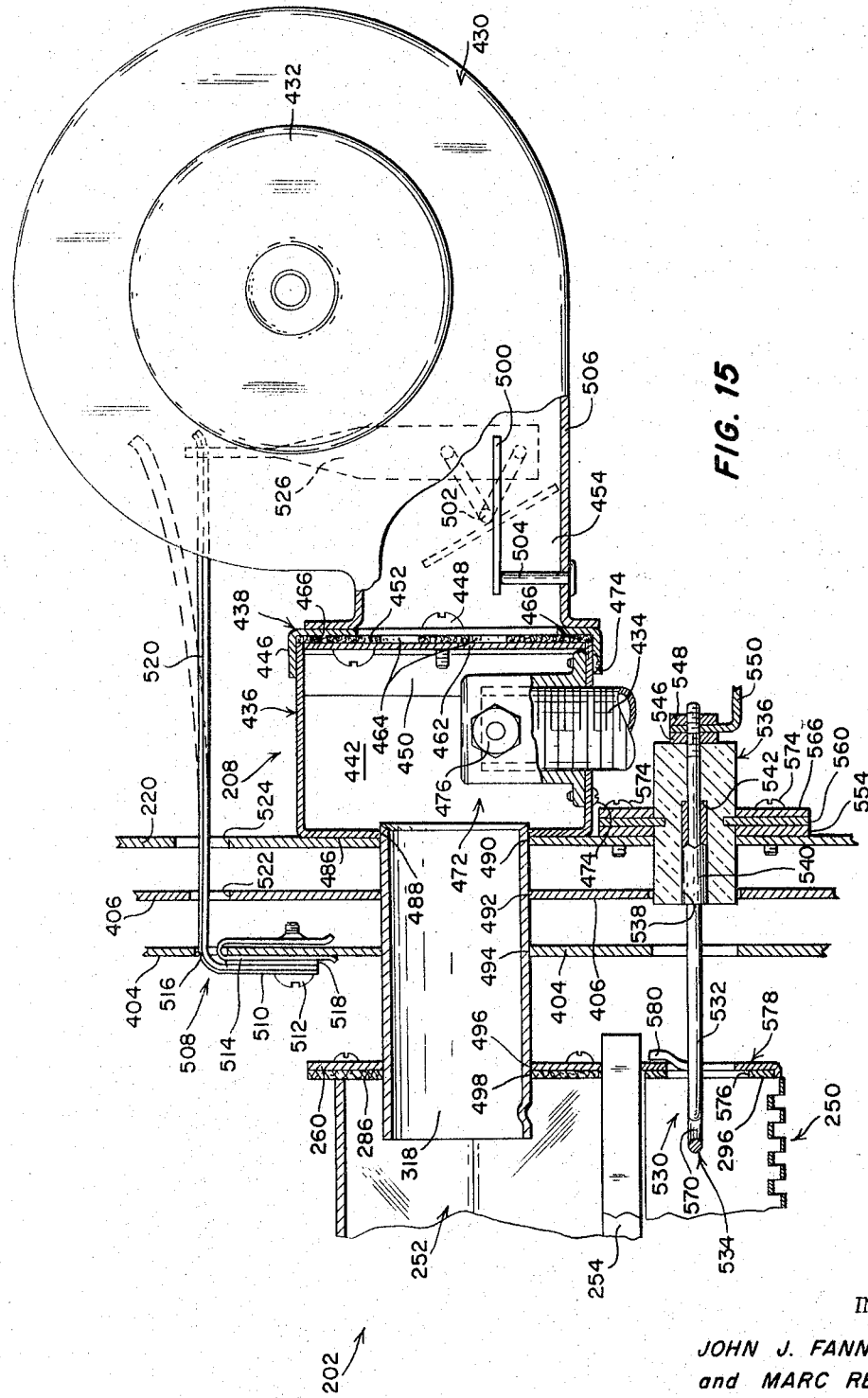

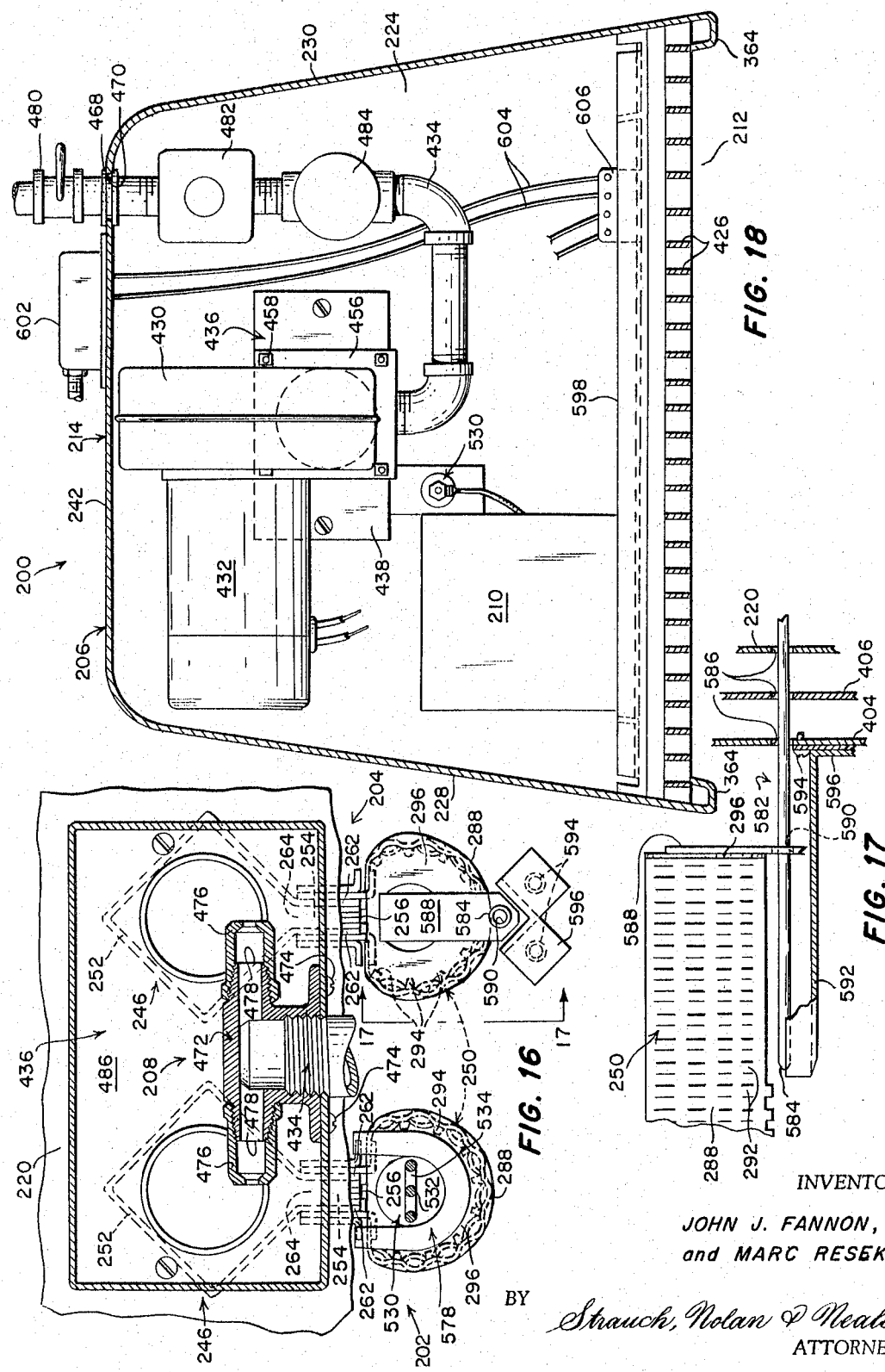

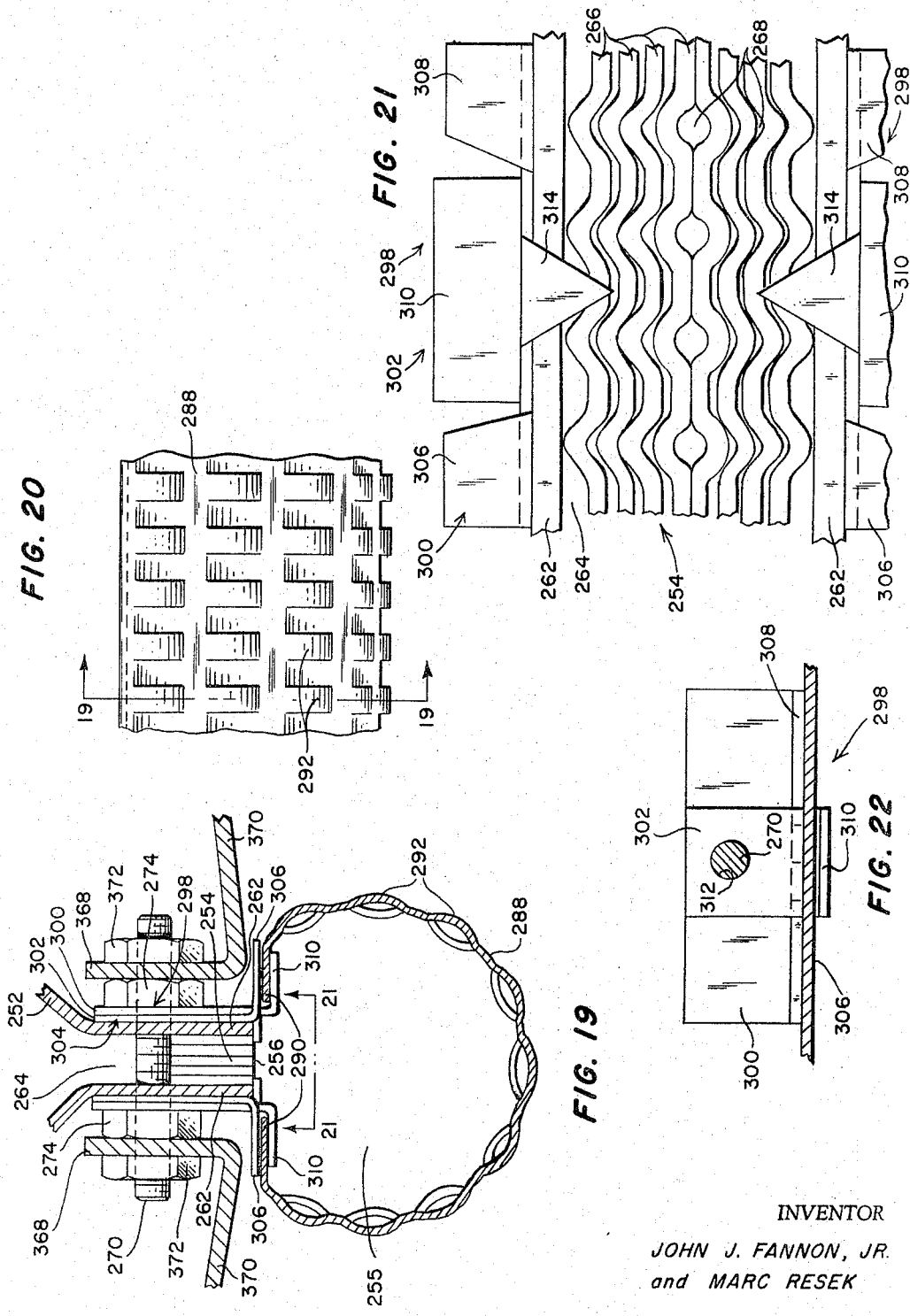

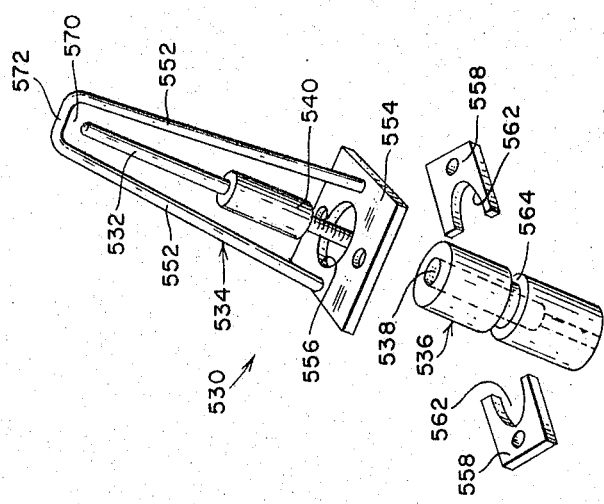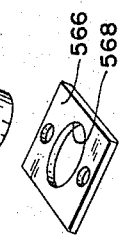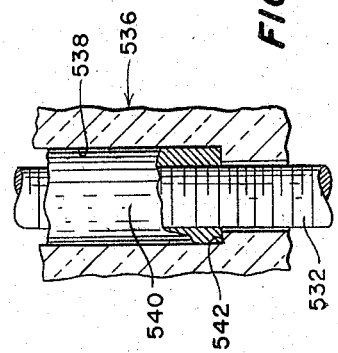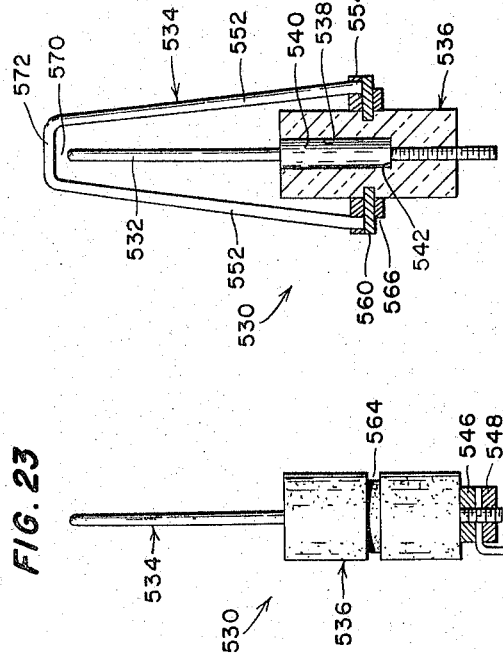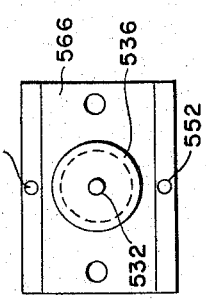

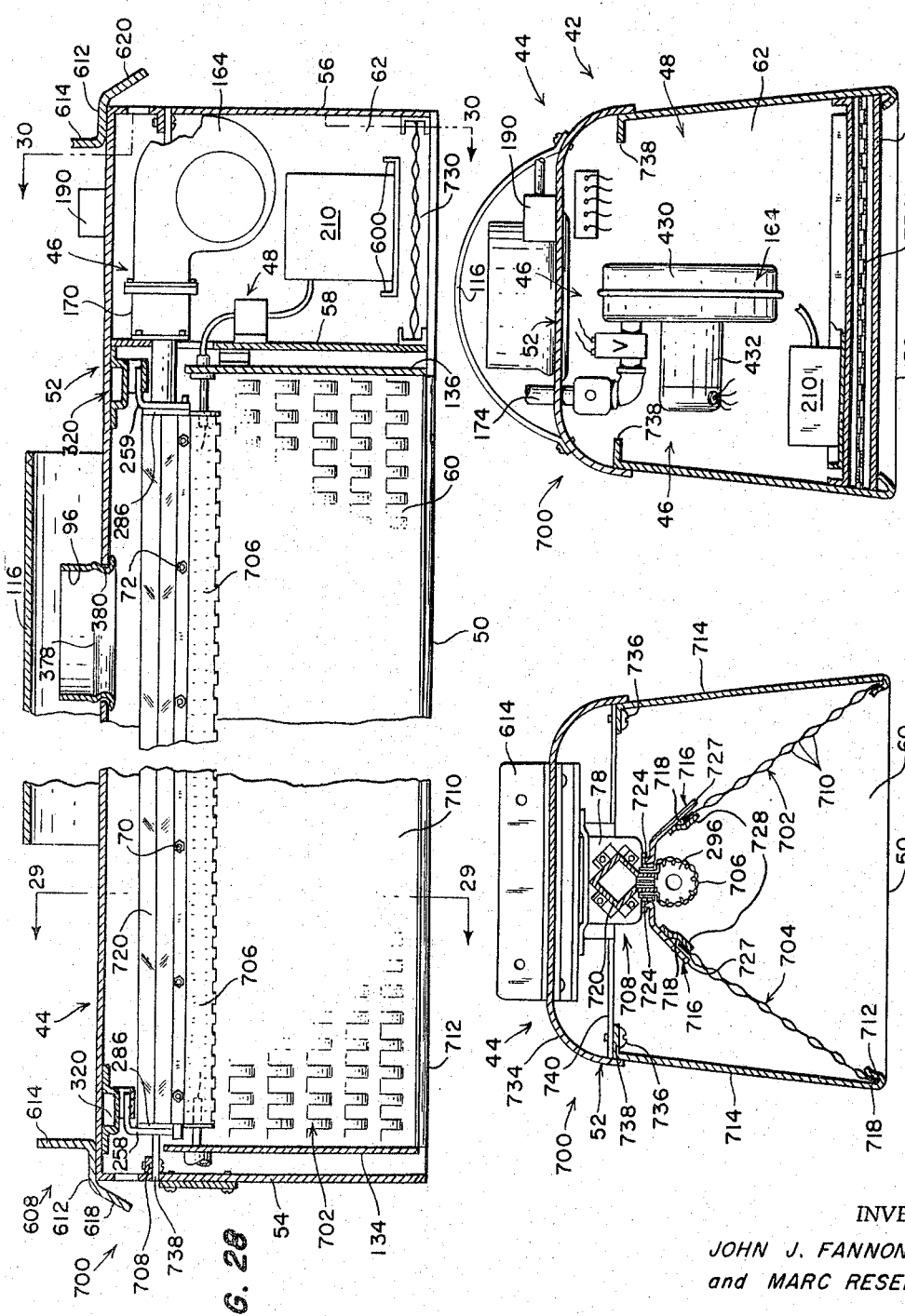

United States Patent Office 3,307,529
Patented Mar. 7, 1967

3,307,529
RADIANT HEATER ARRANGEMENT
John J. Fannon, Jr., Grosse Pointe Park, Mich., and Marc Resek, Shaker Heights, Ohio, assignors, by mesne assignments, to Fostoria-Fannon, Inc., a corporation of Ohio
Filed Oct. 23, 1964, Ser. No. 405,944
28 Claims. (Cl. 126—92)

This invention relates to heating apparatus and, more specifically, to fluid fuel-fired infrared heaters.

Prior heaters of this type have been generally satisfactory, but have had limitations which have restricted their application and limited their market. Among these are: (1) costly construction; (2) limited heat output; (3) inefficient generation of infrared radiation; (4) incomplete combustion resulting in the production of substantial quantities of carbon monoxide and other noxious combustion products; (5) a high rate of ignition failure; (6) scattering of radiation to areas where it is ineffective or unwanted; (7) inability to operate in drafty locations due to outages of pilot lights and disturbance of combustion; (8 inability to be installed out-of-doors due to inadequate protection of components against rain, snow, and wind; (9) incorporation of pilot lights which have added to their cost, required frequent service, and consumed fuel when the heater was not operating; (10) lack of suitable provisions for exhausting combustion products; (11) incorporation of fragile ceramic or wire screen radiants subject to relatively rapid deterioration and to damage in handling, installation, and use; (12) unacceptably expensive and/or unsatisfactory igniters in those prior art heaters having spark type ignition; (13) servicing problems due to inaccessibility of parts and the necessity of replacing costly major components when a relatively inexpensive part failed; (14) need for costly enclosures and additional components to protect exposed flames, pilot burners, and combustion air inlets when operated in drafty locations or out-of-doors. These added components have not only made the heaters very costly, but hvae usually materially reduced the amount of infrared radiation emitted.

While certain prior heaters have overcome some of the undesirable characteristics mentioned above, none has successfully overcome all.

The primary object of the present invention is therefore to provide fluid fuel-fired infrared heaters which do not have any of the limitations and undesirable characteristics of those developed heretofore including those disadvantages and objectionable features described above.

The novel heaters disclosed herein include one or two or more infrared generators, preferably of the type disclosed in our copending Application No. 397,775 filed September 21, 1964, and in copending application No. 395,839 filed September 11, 1964, by John J. Fannon, Jr. (which is assigned to the assignee of this application). The infrared generator or generators are mounted in a housing which encases the infrared radiation generating structure and supports reflectors for directing the radiation onto the objects to be heated. The radiant energy passes from the heater through a novel grate or grill which prevents air from flowing into the casing and cooling the radiant grill or disturbing the combustion process, but which does not intercept an appreciable proportion of the emitted radiation.

The reflectors may also divide the interior of the housing into a centrally vented combustion chamber and form passages for cooling air, which flows between the reflectors and the casing and reduces the casing temperature. The cooling air also: (1) dilutes the combustion products and cools them before they leave the heater, preventing vent stack overheating and ensuring that the concentration of noxious combustion products discharged into the ambient atmosphere is not unacceptably high; and (2) wipes across the distribution tubes of the infrared generators; which reduces their temperature and thereby minimizes the possibility of flashback.

Products of combustion are discharged from the heater through an outlet in the top of the casing which is either provided with a cover to protect it from the rain and snow if it is not to be connected to a vent (especially if it is to be installed out-of-doors) or with a draft hood if it is to be connected to a vent duct.

In the present invention, the heater casing is extended beyond the infrared generator compartment to form a blower-control compartment which houses an electric motor driven combustion air blower, a fuel-air mixing chamber, and control components including a solenoid type fuel flow controlling valve, an igniter transformer, and various safety controls. The bottom of this control compartment is typically closed by a novel grill with openings through which combustion air enters the compartment. Above the gill there is preferably an imperforate control component supporting pan or shelf with outer edges spaced from the walls of the blower-control compartment to permit the combustion air entering the compartment through the grill to flow around the pan to the blower inlet.

The preferred form of combusion air blower is provided with a damper in the blower outlet which is movable between a closed position athwart the outlet to restrict air flow from the blower and an open position in which it is parallel to the axis of the passage and does not impede air flow from the blower. This damper is operatively connected to the end of a bimetallic actuator which is warped between first and second limit positions as the heater alternately heats up to operating temperature and cools off. When the heater is cold, the actuator moves the damper to its minimum flow position, restricting the flow of air to provide a fuel-rich mixture which ignites easily when the heater is started up. As the heater warms up, the bimetallic actuator is heated and moves the damper to the maximum flow position; and the blower supplies enough air to provide a lean mixture which burns with a short sharp flame. Such a flame ensures complete combustion and heats the radiant grid or other radiation emitter of the infrared generator most efficiently.

A restrictor plate between the blower and mixing chamber sized to suit the kind and amount of fuel supplied, is preferably employed to prevent the addition of excess air to and the formation of an overly lean mixture.

In dual generator embodiments of the present invention, fuel enters the mixing chamber through two orifices, each directed across the inlet of one of two combustible mixture supply tubes and sized to provide the correct flow of fuel for the burners of the infrared generators.

In all embodiments of the present invention, the combustible mixture is preferably ignited by a novel inexpensive spark plug designed to prevent shorting in case it is accidentally displaced from its correct position. The spark gap is located just within the radiant grid of an infrared generator at the end of the generator adjacent the blower compartment.

A flame detector is preferably employed with the igniter to cut off the igniter spark when the combustible mixture ignites and to actuate a circuit which will cut off the fuel supply if the flame goes out.

The other heater controls are conventional and connected in a conventional circuit.

In its preferred form the combustion air blower is bolted to the mixing chamber which in turn is bolted to the partition separating the burner and control compartments and has one or more mixture supply tubes projecting into the burner compartment and into the fuel-air mixture distributon tubes of the infrared generators in the burner compartment. Thus, the combustible mixture supply tubes support one end of the infrared generators as well as conduct the combustible mixture into the burners of the infrared generators when the heater is in operation.

The other end of each infrared generator terminates in an end plate which engages a bracket attached to the casing and supports that end of the infrared generator.

The blower-control compartments of our heaters are separated from the infrared generator compartments by a partition, and the heater controls are protected from radiant heat emitted by the infrared generator or generators by shields located in the infrared generator compartment and spaced from the partition. The outer ends of both compartments are closed by hinged covers which provide access to them.

When the infrared generators are in position in the heater casing they are prevented from moving longitudinally by a projection on the closed end cover at the end of the infrared generator compartment. When the cover is open, each infrared generator can be slid off of its supports, thus making removal of an infrared generator for servicing very simple.

The heaters of the present invention are also preferably provided with hangers at each end of the heater casing for suspending the heater from suitable supporting structure.

Among the important features of the novel radiant heaters just described are the following: (1) emission of a very large amount of infrared radiation in proportion to their size; (2) conversion of a high proportion of the heat in the fuel to infrared radiation; (3) comparatively low manufacturing cost per unit of infrared radiation; (4) production of radiation in a wave length band most readily absorbed by objects on which it impinges, over 90% of the radiation being in the band between 1 and 7 microns; (5) incorporation of reflectors which effectively direct emitted radiation within a predetermined angle in space; (6) in heaters provided with dual infrared generators, a mutual heating effect of each generator on the other, which results in higher radiant grid temperatures for a given fuel supply rate and in more uniform radiant grid temperatures; (7) incorporation of novel means for supplying a thoroughly premixed metered volume of fuel and air and means for automatically varying the fuel-air ratio from a rich starting mixture, which assures unfailing ignition, to a lean running mixture assuring high combustion efficiency and combustion products from carbon monoxide and other noxious compounds; (8) provision of direct electric ignition without a pilot burner, the igniter being so arranged that positive starting occurs even in windy locations or at sub-zero temperatures; (9) provision of a control system assuring safe operation under all conditions which the heater might encounter including failure of gas supply or electric power, variations in gas pressure or line voltage, or wide variations in ambient weather conditions; (10) incorporation of a novel spark plug type igniter which is cheaper, safer, and operates more satisfactorily than those heretofore available for heaters; (11) a novel casing which encloses and protects the infrared generator or generators and heater controls, permitting installation out-of-doors, and still allows ready access to all components to permit quick and easy replacement or servicing; (12) novel venting means which permits the heaters to be installed either as a vented unit for connection to a vent flue or as an unvented model out-of-doors or in vented spaces; (13) adaptability for use with a variety of fluid fuels; (14) adaptability to mass production techniques; (15) light weight; (16) pleasing appearance; and (17) all metal construction, eliminating ceramic radiants and provide long service life.

From the foregoing it will be apparent that other, more specific objects of the present invention include the provision of novel improved radiant heaters, which:

(1) Are efficient, inexpensive to manufacture and service, and capable of producing infrared radiation of the wave lengths most readily absorbed by the objects on which it impinges;

(2) Are capable of operating out-of-doors or in drafty locations without the addition of special enclosures or special shielding components;

(3) Are flexible, have a small size/radiant energy output ratio, are compartively light, and have a pleasing appearance;

(4) In conjunction with the preceding object, can be used as either a vented or unvented unit and can operate on a wide variety of fluid fuels;

(5) Have novel controls providing safe operation under all conditions, positive starting even under windy and/or low temperature conditions, and a rich, easily ignitable starting mixture and a lean running mixture providing high efficiency and complete combustion; and (6) Are of all-metal construction and can be manufactured by mass production techniques.

Other objects, additional features, and further objects of our invention will be apparent from the appended claims and as the ensuing detailed description and discussion proceeds in conjunction with the accompanying drawing, in which:

FIGURE 1 is a perspective view of one form of heater construction in accord with the principles of the preesnt invention;

FIGURE 2 is a bottom view of the heater of FIGURE 1, looking generally in the direction of arrows 2—2 of the latter figure;

FIGURE 3 is a side view of the heater with the casing in section, taken generally along line 3—3 of FIGURE 2;

FIGURE 4 is a transverse vertical section through the heater, taken substantially along line 4—4 of FIGURE 3;

FIGURE 8 is a transverse section through the heater of FIGURE 6, taken substantially along line 8—8 of FIGURE 7;

FIGURE 9 is a longitudinal vertical section through the heater of FIGURE 6, taken generally along line 9—9 of FIGURE 7;

FIGURE 10 is a fragmentary section of the heater of FIGURE 6, showing a combustion product vent hood which may be substituted for the rain shield illustrated in FIGURE 9;

FIGURES 11 and 11A are portions of FIGURE 9 to enlarged scales;

FIGURE 12 is an end view of the infrared generators employed in the heater of FIGURE 6, taken generally along line 12—12 of FIGURE 11;

FIGURE 15 is a vertical section through the heater's mixing chamber and certain adjacent parts, taken generally along line 15—15 of FIGURE 13;

FIGURE 16 is a transverse vertical section through the mixing chamber, taken generally along line 16—16 of FIGURE 13;

FIGURE 17 is a side view of a flame detector employed in the heater of FIGURE 6 and the radiant grid adjacent which it is positioned, looking generally in the direction of arrows 17—17 of FIGURE 16;

FIGURE 18 is an end view of the blower and blower-control compartment, taken generally on line 18—18 of FIGURE 9;

FIGURE 19 is an enlarged transverse section of the radiant grid and certain adjacent components of an infrared generator employed in the heater of FIGURE 6, taken substantially along line 19—19 of FIGURE 20;

FIGURE 20 is a side elevation of a portion of a radiant grid employed in the heater of FIGURE 6, looking generally in the direction of arrows 20—20 of FIGURE 19;

FIGURE 21 is a view of an orifice grid employed in the heater of FIGURE 6, looking generally in the direction of arrows 21—21 of FIGURE 19;

FIGURE 22 is a side view of the clip used to assemble the radiant grid and the orifice grid to the fuel-air mixture distribution tube in the infrared generators employed in the heater of FIGURE 6;

FIGURE 23 is a side view of a spark plug employed in the heater of FIGURE 6;

FIGURE 24 is a vertical section through the spark plug;

FIGURE 25 is a bottom view of the spark plug;

FIGURE 26 is a section through the spark plug of FIGURE 25, taken substantially along line 26—26 of FIGURE 25, showing the manner in which the central electrode is attached to the porcelain body of the plug;

FIGURE 27 is an exploded view of the plug;

FIGURE 28 is a longitudinal section through a third form of heater constructed in accord with the principles of the present invention;

FIGURE 29 is a section through the infrared generator compartment of the heater of FIGURE 28, taken substantially along line 29—29 of the latter figure; and FIGURE 30 is a section through the control compartment of the heater of FIGURE 28, taken substantially along line 30—30 of FIGURE 28.

*First single infrared generator heater embodiment*

Figure 5:
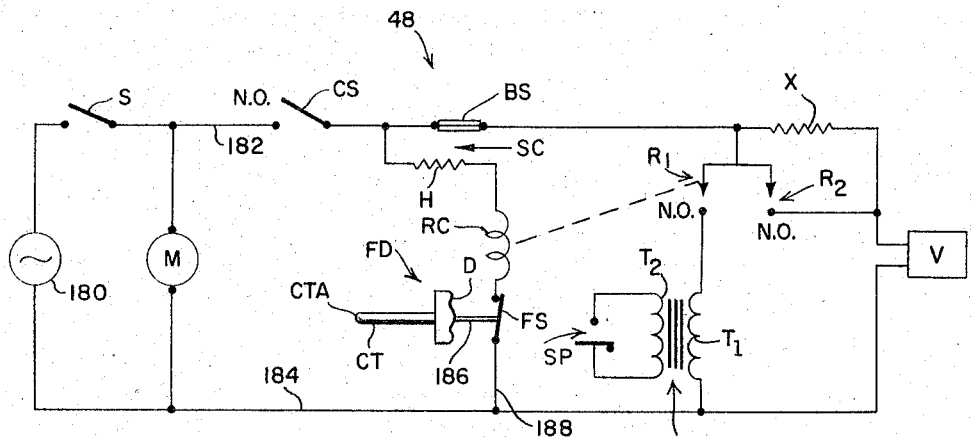
FIGURE 5 is a schematic diagram of the control system of the heater of FIGURE 1.

Referring now to the drawing, FIGURES 1–5 illustrate a radiant heater 40 constructed in accordance with the principles of the present invention and including a combustion type infrared generator 42 housed in a heater casing 44 together with combustible mixture supply and heater control systems 46 and 48.

Casing 44, which is preferably fabricated of aluminum, has an open bottom 50 and is composed of a U-shaped member 52 and removable end covers 54 and 56 fastened together by bolts (not shown) or other suitable fasteners and a transverse partition 58, which divides the interior of casing 44 into an infrared generator compartment 60 and a blower-control compartment 62. End covers 54 and 56, as shown in FIGURE 3, have upper edges 63 spaced below the top wall 64 of U-shaped cover member 52, providing outlet passages 65 from infrared generator and blower-control compartments 60 and 62, respectively.

As best shown in FIGURES 3 and 4, infrared generator 42 consists of a tubular line burner 66, which extends the length of infrared generator compartment 60 from adjacent partition 58 to adjacent end cover 54, and two trough-like, relatively short, radiant grids 67 and 68, independently assembled to line burner 66 in end-to-end relationship to minimize temperature change induced distortions. Grids 67 and 68 are fixed to line burner 66 by bolts 70 extending transversely through the grids and burner and by nuts 72, which are threaded on bolts 70 and clamp the sides 74 of the radiant grids against burner 66.

Line burner 66, which may be made of any desired heat resistant metal, is composed of an elongated cylindrical tube 76 to which end covers 78 and 80 are fixed, as by welding. End cover 80 is centrally apertured to accommodate a combustible mixture supply conduit 82, which extends from the combustible mixture supply system 46 in compartment 62 through an aperture in partition 58 into the interior of tube 76. The combustible fuel-air mixture conveyed to the interior of tube 76 through conduit 82 flows from the tube through ports 84 drilled or otherwise formed in its lower side (see FIGURE 4) and burns in a combustion zone 86 adjacent the exterior surface 88 of the tube. Backfires are prevented by utilizing ports having a sufficiently small diameter/length ratio that flame will not flash back through the ports to the interior of burner 66. This ratio will vary for different applications depending upon the type of fuel, velocity of the flow through ports 84 (which exerts a cooling effect on burner tube 76), temperature attained by the burner, etc., but can be readily ascertained for different applications of the present invention.

As the combustible mixture burns adjacent tube 76, the combustion products heat radiant grids 67 and 68 to incandescence by direct radiation and also by wiping across the grids as they flow to and through apertures 90 in the grids.

Grids 67 and 68, which are preferably fabricated of a heat resistant material such as Inconel, emit radiant energy in the directions indicated by the arrows in FIGURE 4. The infrared energy emitted from radiant grids 67 and 68 is concentrated into a beam and projected in the desired direction by generally semiparabolic reflectors 92 and 94, which extend the length of burner compartment 60 on opposite sides of infrared generator 42. Reflectors 92 and 94 are fixed to the side walls 96 and 98 of casing member 52, from which they are separated by spacers 100, as by screws 102. This arrangement provides passages 104 between reflectors 92 and 94 and casing 44, through which cooling air flows to prevent overheating of the reflectors and casing.

The upper edges 106 of the reflectors are spaced from infrared generator 42, as best shown in FIGURE 4, to provide passages 108 from which the combustion products exhausted from combustion zone 86 through ports 90 in radiant grids 67 and 68 flow to the upper part of casing 44.

The combustion products are vented from casing 44 through a flue collar 110 extending through an aperture 112 in the upper wall 64 of casing member 52 and locked in place by beads 114 formed in the collar.

To prevent rain from entering flue collar 110 when heater 40 is installed out-of-doors, an inverted-trough-shaped rain cover 116 is fixed to the exterior of upper casing wall 64 as by rivets 118. As shown in FIGURES 3 and 4, rain cover 116 is of generally the same width as flue collar 110, but has a length substantially longer than the flue collar diameter so that it extends well beyond the flue collar and effectively prevents even a driving rain from entering the open upper end of the flue collar.

To dilute and cool the combustion products flowing upwardly through casing 44 before they enter flue collar 110, a flat, plate-like, horizontally extending baffle 120 is mounted between line burner 66 and the flue collar. Baffle 120 is supported from the upper wall 64 of casing member 52 by Z-shaped brackets 122 fixed to the ends of baffle 120 as by welding and to casing member 52 by the rivets 118 mentioned previously. Baffle 120 directs the combustion products flowing upwardly through passages 108 laterally into the streams of cooling air flowing through passages 104, which mixes with the combustion products. This ensures that the concentration of noxious compounds in the vented combustion products is not unacceptably high and that the temperature of the vented products is low enough that they will not overheat the vent stack, if one is employed.

In addition to performing the functions just described, baffle 120 supports the end of infrared generator 42 adjacent end cover 54 of casing 44. Specifically, as shown in FIGURE 3, infrared generator includes an L-shaped bracket 124 having a vertically extending leg 126 fixed to the end cover 78 of line burner 66 and a mounting leg 128 extending horizontally along the upper side of burner tube 76. Mounting leg 128 is fixed by bolts 130 and nuts 132 to baffle 120.

The opposite end of infrared generator 42 adjacent partition 58 is supported from the partition by the combustible mixture supply tube 82 which, as described previously, extends through partition 58 and through end cover 80 of line burner 66.

To prevent the infrared radiation emitted into casing 44 and the combustion products circulating through it from overheating the casing and the control components in compartment 62, the cooling air passages 104 described previously are provided between U-shaped casing member side walls 96 and 98 and reflectors 92 and 94. To further minimize heating of the casing and control components, heat shields 134 and 136, 138 are mounted in infrared generator compartment 60 in spaced relation to casing end member 54 and partition 58, respectively. As shown in FIGURE 3, shield 134, fixed to casing member 52 and to reflectors 92 and 94 in spaced relation to end cover 54, provides an open ended passage 140 into which cooling air flows from the open casing bottom 50. At the upper end of passage 140, the cooling air flows out of the casing through the outlet passage 65 between the upper edge 63 of end cover 54 and the top wall 64 of U-shaped casing member 52.

Heat shields 136 and 138, which are centrally apertured to accommodate combustible mixture supply conduit 82, are fixed as by bolts 142 to casing partition 58. Shield 136 is also fixed, as by welding, to the ends of reflectors 92 and 94 adjacent casing partition 58 to lend additional support to the reflectors.

Spacers 144 are journalled on bolts 142 between heat shields 136 and 138 and between heat shield 138 and partition 58 to maintain these components in a parallel, spaced apart relationship providing vertically extending, open end passages 146 therebetween. Cooling air enters the lower open ends of channels 146 through the open bottom side 50 of casing 44 and flows upwardly through the passages, carrying away heat emanating from infrared generator 42 and preventing its transfer to the components of the control system 48 in blower-control compartment 62. The upper edges of heat shields 136 and 138 are spaced below the top wall 64 of casing member 52, permitting the cooling air to flow out of the upper ends of channels 146 along casing member top wall 64 and through flue collar 110.

Referring now to FIGURE 3, overheating of the control system components in blower-control compartment 62 is further minimized by a flow of cooling air from the ambient atmosphere through the open bottom side 50 of casing 44 upwardly through compartment 62 and out through the discharge opening 65 between the upper edge 63 of end cover 56 and the top wall 64 of U-shaped cover member 52. To prevent rain or other precipitation from entering through outlet opening 65 into compartment 62 or through the similar outlet opening 65 into compartment 60 and to attach the novel radiant heater 40 just described to its supporting structure, Z-shaped hanger brackets 148 and 150 are employed. Hanger brackets 148 and 150, which substantially span the ends of radiant heater 40, are attached at opposite ends of the heater to the top wall 64 of U-shaped casing member 52 as by welding the intermediate legs 152 of the brackets to the casing. The upper, vertically extending, mounting legs 154 of the brackets are provided with apertures 156 (see FIGURES 1 and 4) through which bolts or other fasteners can be inserted to attach the mounting legs to supporting structure 158 shown in phantom lines in FIGURE 1. The lower leg 160 of bracket 148 extends downwardly at an angle over and spans the end cover 54 at the end of infrared generator compartment 60, preventing rain from entering the cooling air outlet passage 65 between the upper edge 63 of end cover 54 and the top wall 64 of casing member 52. The third downwardly extending leg 162 of mounting bracket 150 is similarly configured to extend down over the cooling air outlet opening 65 between the upper edge 63 of casing end cover 56 and the top wall 64 of U-shaped casing member 42 to prevent rain and other precipitation from entering blower-control compartment 62.

Referring now to FIGURES 2 and 3, the combustible mixture supply system 46 of radiant heater 40 (from which the combustible fuel-air mixture flows into supply conduit 82 and then into line burner 66) includes a combustion air blower 164 mounted in blower-control compartment 62 by bolting its outlet end 166 to the inlet side 168 of a fuel-air mixture chamber 170. The outlet side 172 of the mixing chamber is welded to and communicates with the inlet of supply conduit 82 and is bolted to casing partition 58, supporting it and blower 164 from the partition.

Also communicating with the interior of mixing chamber 170 is a fuel supply conduit 174 which extends into the interior of the mixing chamber and terminates in a restricted orifice (not shown).

Combustion air blower 164, mixing chamber 170, and fuel supply conduit 174 with its terminal orifice function in the conventional manner. Blower 164 discharges a stream of air into the mixing chamber where the air is mixed with a gaseous fuel flowing through the outlet orifice at the end of supply conduit 174 into the mixing chamber at high velocity.

Combustion air enters blower-control compartment 62 through the open lower side 50 of casing 44 which is covered with a screen 176 to prevent the larger foreign objects from entering the compartment. Smaller objects are screened out by a filter 178 of material such as steel wool in compartment 62 above screen 176.

Radiant heater 40 may be controlled manually or by the control system 48 housed primarily in compartment 62, which is shown in schematic form in FIGURE 5. Referring now to the latter figure, the control system components include:

(1) A solenoid valve V which is normally closed but which opens when its solyenoid is energized. Solenoid valve V is disposed in fuel supply conduit 174 and controls the flow of fuel into mixing chamber 170.

(2) A normally open centrifugal switch CS incorporated in the motor M of combustion air blower 164. Switch CS is connected between a 115 volt power source 180 and fuel valve V and closes its contacts when the motor reaches a predetermined operating speed. As switch CS is open unless motor M is at operating speed, it prevents opening of the gas valve if the blower is not in operation to supply combustion air.

(3) A manual or thermostatic switch S connected in series with power source 180 which prevents operation of heater 40 when the switch is open.

(4) A spark transformer T which generates 4200 volts in its secondary winding T2 when its primary winding T1 is energized by 115 volts.

(5) A spark plug SP which has its spark gap in the combustion zone 86 adjacent the outer surface 88 of burner tube 76 near the end of the burner tube adjacent partition 58.

(6) A resistor X which is adapted to be connected in series between the solenoid of fuel valve V and 115 volt power source 180. The resistance of resistor X is such that, when it is connected in series between valve V and power source 180, the current flowing through the solenoid will maintain the valve open if it is already open, but will not open the valve if it is closed.

(7) A single throw, double pole relay R having a coil RC connected to power source 180 through centrifugal switch CS and normally open contacts R1 and R2. Contact R1 is connected between power source 180 and the primary winding T1 of spark transformer T and, when closed, energizes the transformer. Contact R2 is connected in parallel with resistor X and, when closed, completes a shunt circuit around the resistor.

(8) A flame detector FD which comprises a stainless steel capillary tube CT closed at one end and connected at its opposite end to the interior of a capsule having a flexible diaphragm D extending across one side. The capillary tube and capsule are filled with mercury which, upon vaporization, moves the diaphgram to the right as shown in FIGURE 5. The closed end CTA of the capillary tube is located close to radiant grid 67 (FIGURE 3) so that, when line burner 66 is in operation, heat emitted from radiant grid 67 vaporizes the mercury in the tube.

(9) A flame switch FS which is connected in series with relay coil RC across the main leads 182 and 184 from power source 180 and has an actuator 186 coupled to diaphragm D of flame detector FD. With capillary tube CT of flame detector FD unheated, switch FS is closed. When line burner 66 is in operation and capillary tube CT heated, the movement of diaphragm D opens flame switch FS.

(10) A safety cut off SC which includes a heating coil H connected in series with relay coil RC in branch lead 188 and a normally closed bimetallic switch BS in main lead 182, which opens after a predetermined perior of current flow through heater H.

(11) An outlet box 19 mounted on the top wall 64 of U-shaped casing member 52 which facilitates the connection of control system 48 to the source of 115 volt operating voltage 180.

With the exceptions noted previously such as combustion air blower motor M and outlet box 190, the control system components discussed above are mounted on a tray 192 fixed in the bottom of blower-control compartment 62 as by welding or otherwise fastening its ends to the side walls 96 and 98 of U-shaped casing member 52.

Operation of heater 40 is initiated by the closing of manually or thermostatically operated switch S, which completes a circuit through motor M of combustion air blower 164, causing the blower to run and supply combustion air to mixing chamber 170. When the motor is up to normal operating speed, centrifugal switch CS closes, completing a circuit from power source 180 through leads 182 and 188, heater H of safety cutoff SC, relay coil RC, and normally closed flame switch FS to the return lead 184 connected to power source 180.

Energization of relay coil RC causes contacts R1 and R2 to close. Closing of contact R1 energizes transformer primary T1, generating a voltage of 4200 volts in secondary T2, which causes a spark across the spark gap of spark plug. SP.

Closing of contact R2 completes a circuit from power source 180 around resistor X to and energizes solenoid valve V which opens, permitting gas to flow through fuel supply conduit 174 to mixing chamber 170, where it is mixed with air from blower 164 to form a combustible mixture. This mixture flows from mixing chamber 170 through conduit 82 into tube 76 of line burner 66 and through the ports 84 in tube 76 to the combustion zone 86 adjacent its exterior surface 88 where it is ignited by the spark across the spark gap of spark plug SP and burns, heating radiant grids 67 and 68 to incandescence.

If the gas fails to ignite within a predetermined period (or goes out for any reason) the current flow through heater H will generate sufficient heat to warp bimetallic switch BS open and interrupt the circuit to spark transformer T and solenoid fuel valve V, cutting off the fuel flow and ignition spark.

If the burner ignites, it heats capillary tube CT, causing a movement of diaphragm D to the right to open flame switch FS. This breaks the circuit through heater H so the safety cutout bimetallic switch BS remains closed, preventing the cutting off of the fuel flow and ignition spark in the manner described in the preceding paragraph. Opening of flame switch FS also interrupts the circuit to and deenergizes relay coil RC, causing relay contacts R1 and R2 to open.

Opening of contact R1 deenergizes spark transformer T, cutting off the spark. Opening of contact R2 puts resistor X in series with the solenoid which, as mentioned above, limits the current through the solenoid of valve V to an amperage which will hold valve V open but is too low to open it. Therefore, if valve V later closes because of a stoppage of electric power or failure of the gas supply, for example, valve V will not reopen until radiant heater 40 has gone through another starting cycle.

The heater control system just described is, for the most part, conventional and, by itself, forms no part of the present invention except for the relative disposition between its components and other components of radiant heater 40. A more elaborate description of this system is therefore not deemed necessary.

Numerous modifications may be made in the novel radiant heater 40 just described without exceeding the scope of the present invention. For example, other forms of infrared generators may be substituted for generator 42. Suitable substitute infrared generators include those disclosed in United States Patent No. 2,775,294 issued December 25, 1956, to G. Schwank for Radiation Burners and those disclosed in copending applications Nos. 370,795 filed May 28, 1964, now Patent No. 3,224,698 granted December 21, 1965 by A. Johnson for Infrared Radiant Heater and Grid Therefor (which was assigned to the assignee of this application at the time the latter was filed); 395,839 filed September 11, 1964, by J. Fannon, Jr., for Apparatus; and 397,775 filed September 21, 1964, by J. Fannon, Jr., et al. for Apparatus. Or, as further examples, other commercially available control circuits may be substituted for that illustrated in FIGURE 5 and described above and reflectors of configurations other than parabolic may be substituted for the reflectors shown in FIGURE 4. These and other modifications of the embodiment just described, which will be readily apparent to those skilled in the arts to which this invention pertains, are therefore fully intended to be embraced within the scope of this invention except as specifically excluded from the appended claims.

*Dual generator heater*

FIGURES 6–22 illustrate a radiant heater 200 which is of the same physical dimensions and employs the same combustion air blower and heater controls as the radiant heater 40 just described, but is capable of providing about twice as much heat as the latter. Since the blower, controls, and casing are the major elements of cost, the cost per unit of radiant heat output is materially reduced in this form of the present invention.

The increase in heat output is accomplished, in part, by employing two combustion type infrared generators mounted in closely spaced side-by-side relationship and by providing a manifold at the mixing chamber for feeding the combustible fuel-air mixture to both generators.

Increased efficiency is also obtained by employing infrared generators of the novel improved construction disclosed in copending Fannon application No. 395,839 and our copending application No. 397,775. Other advantages of employing this type of infrared generator, which are of particular importance for radiant heater applications, are that backfiring is virtually impossible and that the burner ports can be easily cleaned if they become obstructed by dirt.

Another novel and important feature of heater 200 is a novel automatically operated damper in the outlet of the heater's combustion air blower which provides a rich starting mixture and a lean, economical, running mixture. This innovation assures economical operation and prompt starting, even under adverse conditions such as very low temperatures and/or high winds.

In addition, heater 200 is provided with a novel honeycomb grate on the open side of the heater casing to protect the radiant grids from the cooling effects of wind, providing greatly improved efficiency in applications of the present invention where the heater is subjected to violent drafts or windy conditions. This important innovation also assures prompt and positive ignition even though a strong wind is blowing on the heater.

Moreover, the design of FIGURES 6–22 is easy to service as: (a) access to the burner and blower-control compartments is available by opening hinged end panels; (b) any control can be readily removed; (c) correct reconnection of the terminals of removed components is assured; and (d) either infrared generator can be removed merely by opening the burner compartment end panel and sliding the generator out.

Another advantage of this embodiment of the present invention is that, with only minor changes in structure, either an outdoor unvented model or a flue connected vented model can be produced.

Figure 6:
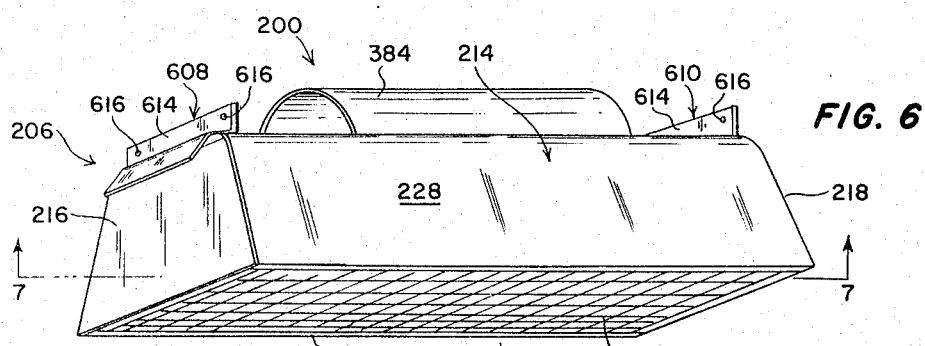
FIGURE 6 is a perspective view of a second form of heater constructed in accord with the principles of the present invention.
Figure 7:
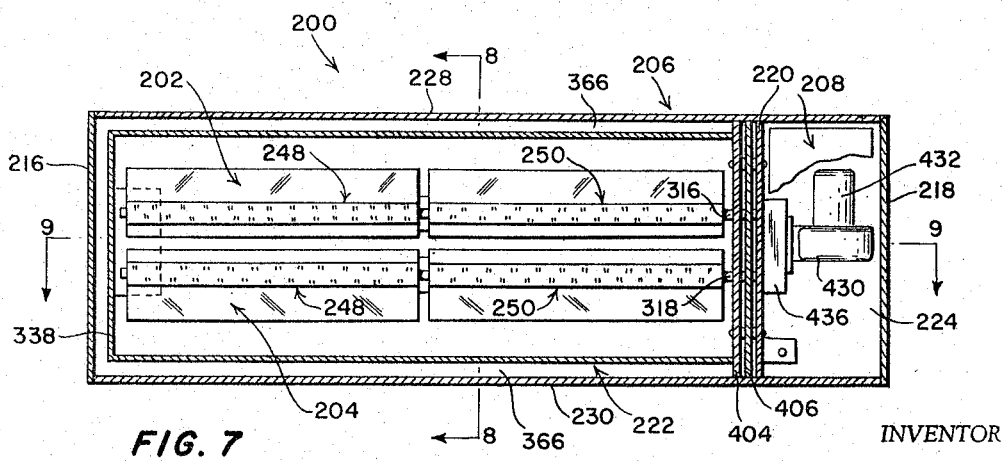
FIGURE 7 is a bottom view of the heater of FIGURE 6 with certain parts broken away to show internal components of the heater.

Referring first to FIGURES 6–8, radiant heater 200 includes two combustion type infrared generators 202 and 204 mounted in side-by-side relationship in a heater casing 206 together with combustible mixture supply and heater control systems 208 and 210.

Turning now to FIGURES 8 and 9, heater casing 206, which is preferably fabricated of aluminum and has an open bottom side 212, is composed of a U-shaped main cover member 214, end covers 216 and 218, and a transverse partition 220, which divides the interior of casing 206 into an infrared generator compartment 222 and a blower-control compartment 224. As is best shown in FIGURE 11A, end cover 216 is pivotally fixed to U-shaped cover member 214 by aligned screws 226 (only one of which is shown) which extend through the side walls 228 and 230 of U-shaped cover member 214 into vertically extending flanges 232 bent inwardly from the vertical edges of end cover 216 and disposed within U-shaped casing member 214 adjacent its side walls 228 and 230.

Adjacent their lower ends, flanges 232 are provided with elongated slots 234 which open onto the free edges 236 of the flanges. Cover 216 is retained in the closed position shown in FIGURE 11 by bolts 238, which extend through U-shaped casing members side walls 228 and 230, and retainers 240, threaded on the inner ends of the bolts, which clamp flanges 232 against the casing side walls. The foregoing arrangement enables access to infrared generator compartment 222 to remove, replace, or service infrared generators 202 and 204 to be readily gained simply by loosening bolts 238 to release the frictional grip between flanges 232 and casing member side walls 228 and 230 and swinging end cover 216 upwardly around screws 226.

Heater casing end cover 218 is pivotally fixed to casing member 214 in the manner just described in conjunction with end cover 216 to provide ready access to blower-control compartment 224.

Partition 220 is fixed to U-shaped casing member 214 by spot welding or riveting casing member side walls 228 and 230 and top wall 242 to flanges 244 bent from the top and side edges of the partition.

As best shown in FIGURES 6–8, 16, 17, and 19–22, each of the infrared generators 202 and 204 housed in the heater casing 206 just described consists of a line burner 246 and two radiant grids 248 and 250, which convert the energy liberated by the combustion of a fuel-air mixture in the line burners into infrared radiation.

Referring now to FIGURES 7–9, 15, and 19–22, each line burner 246 includes a fuel-air mixture distribution tube 252 approximately 36 inches long; an orifice grid 254, through which the fuel-air mixture flows from the interior of distribution tube 252 to a combustion zone 255 adjacent the outer end or face 256 of the grid; and end brackets 258 and end plates 260, which form closures for the open ends of distribution tube 252 and which, in the case of brackets 258, support infrared generators 202 and 204 from casing 206.

The distribution tube 252 of each line burner 246 is formed from sheet metal (aluminized sheet steel is satisfactory) into a generally diamondlike configuration. The opposed lateral edge portions of the sheet from which distribution tube 252 is formed are bent at angles to the two distribution tube walls with which they are integral to form two parallel, spaced apart flanges 262 (see FIGURE 19) providing an outlet passage 264 between the interior and the exterior of the distribution tube. The preferred method of fabricating distribution tube 252 is described in copending Fannon application No. 395,839.

Orifice grid 254, through which the combustible fuel-air mixture flows from distribution tube 252, is mounted in outlet passage 264 between flanges 262 of fuel-air mixture distribution tube 252 to prevent the flame from flashing back from the combustion zone through this passage to the interior of the tube. Orifice grid 254 may be of the ribbon type shown in FIGURE 21 (it is not critical that a ribbon type orifice be employed), which consists of embossed metallic ribbons 266 providing a number of small passages 268 extending between and opening onto the opposed lateral edges of the assemblage of ribbons. In the illustrated embodiment of the present invention, the ribbons 266 in orifice grid 254 are of 0.015 inch thick stainless steel 0.375 inch wide, and the largest passages through the grid have a diameter or width of approximately 0.050 inch and a length of 0.375 inch.

The foregoing dimensions and the particular configuration of the individual ribbons 266 is not critical in the present invention; and other numerical factors such as the total area of the lateral passages may be varied as desired for particular applications of this invention. It is necessary, however, that the lateral passages be sufficiently small in cross section and sufficiently long that flame cannot flash back through the passages from the combustion zone 255 adjacent the outer face 256 of orifice grid 254 to the interior of distribution tube 252. In addition, the total area of the openings must be great enough that the combustible mixture will flow from distribution 252 to the combustion zone in sufficient quantity to maintain the desired rate of combustion. As suitable orifice structures are disclosed in copending Fannon application 395,839 and as the construction of the orifice grid, by itself, is not part of the present invention, it is not believed necessary to describe it in more detail herein.

As shown in FIGURE 15, the ribbons 266 in orifice grid 254 are about one inch longer than fuel-air mixture distribution tube 252 so that each end of the grid projects for a distance of about one-half inch from the corresponding end of the distribution tube. In these projecting grid portions the individual ribbons 266 are brazed together to connect them into a unitary structure and to prevent leakage of the combustible mixture.

Orifice grid 254 is removably retained in the outlet passage 264 between distribution tube flanges 262 by studs 270 and end clamp bolts 272. Studs 270 extend laterally through distribution tube flanges 262 at spaced intervals along the tube and locate orifice grid 254 relative to the inner end of the passage 264 between distribution tube flanges 262. Retainers 274, threaded on the ends of the studs 270, clamp flanges 262 against orifice structure 254 to removably retain it in outlet passage 264.

End clamp bolts 272 are located at the ends of the two infrared generators 202 and 204 and extend laterally through distribution tube flanges 262 at the same level as studs 270. Nuts 275, threaded on end bolts 272, securely clamp the ends of the distribution tube flanges against orifice grid 254.

Referring now to FIGURES 9 and 11, the sheet metal end brackets 258 by which the ends of infrared generators 202 and 204 nearest casing end cover 216 are fixed to casing 206 have two integral legs 276 and 278 bent at right angles into an L-shaped configuration. With end brackets 258 assembled to distribution tubes 252, bracket legs 276 are juxtaposed to and form closures for the open ends of the distribution tubes; and bracket legs 278 extend in parallel, spaced relationship along the tops of the distribution tubes.

End plates 260 are similar to end brackets 258, but have only a single, closure forming leg.

Figure 14:
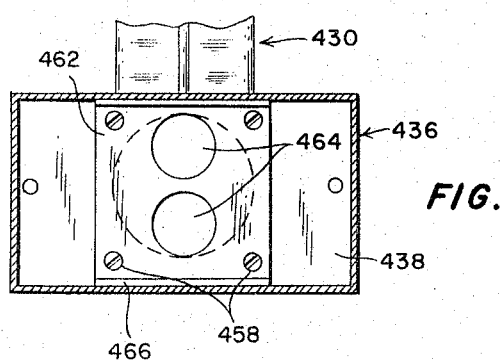
FIGURE 14 is an end view of the outlet of the combustion air blower employed in the heater of FIGURE 6, taken generally along line 14—14 of FIGURE 13.

In end brackets 258 and end plates 260, the closure forming leg extends well below the outer end or surface 256 of orifice grid 254. A rectangular aperture or slot (not shown) is formed in each of the closure legs adjacent its lower end. As shown in FIGURE 14, the ends of orifice 254 extend through these apertures so that the elongated closure forming legs assist in retaining orifice grid 254 in its proper position relative to distribution tube 252 despite the expansion of various heater components as infrared generators 202 and 204 heat up and cool off.

The orifice grid supporting arrangement just described is of substantial importance in the practice of the present invention as it permits orifices 254 to be readily removed for servicing or replacement by loosening retainers 274 and the nuts 275 on bolts 272 and withdrawing the orifice grids through the apertures in end brackets 258 or the apertures in end plates 260.

End brackets 258 and end plates 260 are attached to fuel-air mixture distribution tubes 252 by angle clamps 280 which are best illustrated in FIGURE 8 and which are fixed, as by spot welding, to the ends of fuel-air mixture distribution tubes 252. Angle clamps 280 are described in detail in our copending application No. 397,775, to which reference may be had, if desired, for a more detailed description of these components.

The closure forming legs 276 of end brackets 258 and the end plates 260 are fixed to angle clamps 280 by bolts 282. Nuts 284, threaded on bolts 282, clamp end brackets 258 and end plates 260 against the angle clamps.

Figure 13:
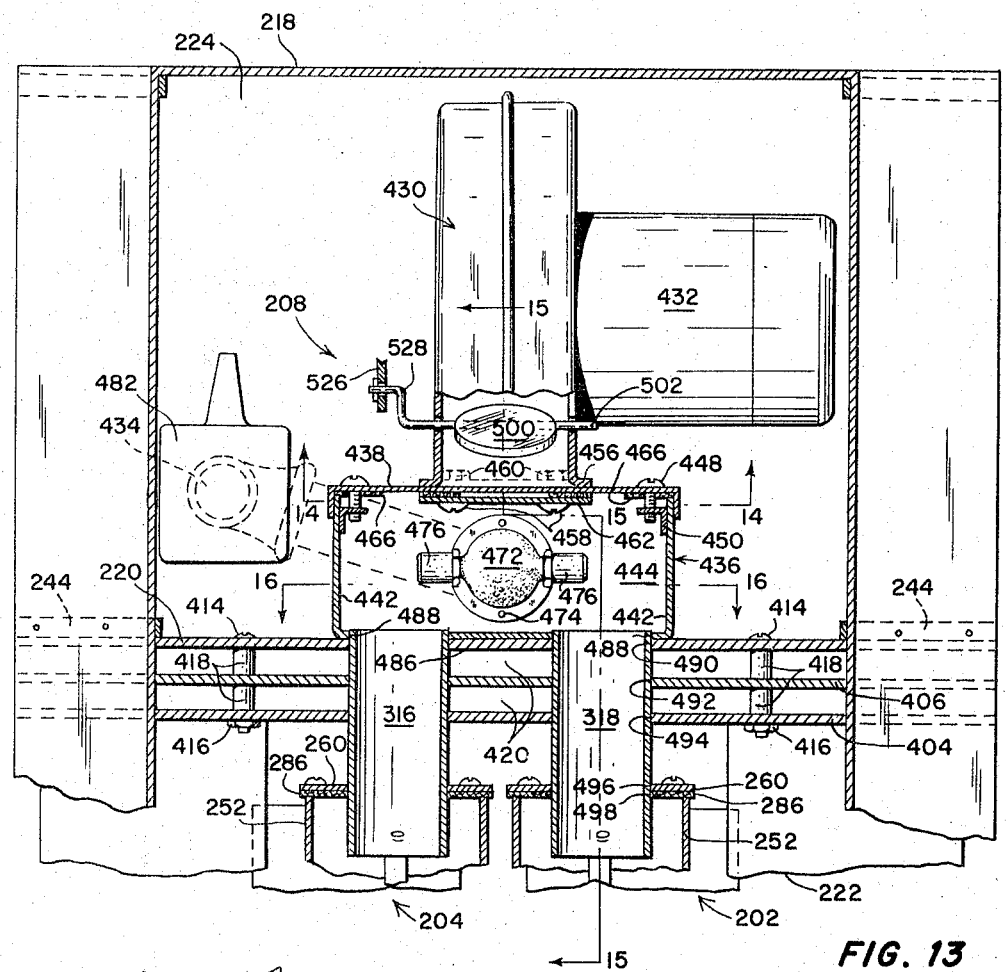
FIGURE 13 is a horizontal section through the mixing chamber and adjacent parts of the heater of FIGURE 6, taken substantially along line 13—13 of FIGURE 9.

Referring now to FIGURES 13 and 15, to prevent the combustible mixture from leaking through the ends of fuel-air mixture distribution tubes 252, circular gaskets 286 are assembled between the closure forming legs 276 of end brackets 258 (and end plates 260) and the associated ends of distribution tubes 252 (see FIGURES 11 and 13). When nuts 284 are tightened, gaskets 286 are compressed and form gastight seals between the ends of the distribution tubes and the associated closure forming legs 276 of the end brackets and the end plates.

Radiant grids 248 and 250, which are heated to infrared radiation emitting, incandescent temperatures by the combustion in line burners 246, are preferably of the apertured construction disclosed in copending Johnson application No. 370,795 modified in the manner disclosed in the above-identified Fannon and Fannon et al., applications 395,839 and 397,775. The radiant grids by themselves are not part of the present invention, and it is therefore not believed to be necessary to describe them in detail herein. Briefly, however, the radiant grids, which are slightly less than 18 inches long in the illustrated embodiment of the present invention, are each made of a sheet of heat resistant metal such as Inconel or Hastaloy-X or a coated alloy bent into a horseshoe configuration having a radius of about 0.75 inch and providing a radiation emitting body 288 and inturned mounting flanges 290 extending toward each other from opposite sides of body 288 (see FIGURE 19).

As best shown in FIGURES 19 and 20, the body 288 of each radiant grid 248 and 250 is formed (by stamping or other process) into a configuration in which loops 292 are displaced from the plane of the sheet from which the grid is formed at regular intervals to form openings extending normal to the sheet through which the combustion products may pass from the combustion zone. As discussed in detail in copending application No. 370,795, this results in a grid which is a highly efficient emitter of infrared radiation and which effectively protects the flame from air currents of sufficient strength to quench or snuff it out. In flanges 290, loops 292 are preferably flattened back into the plane of the flanges or are omitted to provide flat flanges which can be readily clamped between the members employed to attach grids 248 and 250 to distribution tubes 252.

Referring now specifically to FIGURE 16, ears 294 are bent from the ends of each grid body 288. Centrally apertured end plates 296 are fixed to opposite ends of each pair of grids 248 and 250 by spot welding them to ears 294. End plates 296 support the open ends of grids 248 and 250 and maintain the bodies of the grids in the desired shape. They also prevent air currents from disturbing the flame in combustion zones 255.

Each of the two infrared generators 202 and 204 has two radiant grids 248 and 250 fixed to the fuel-air mixture distribution tube 252 of its line burner 246 in slightly spaced apart end-to-end relationship.

Radiant grids 248 and 250 are assembled to distribution tubes 252 by clips 298, each formed from two pieces of heat resistant sheet metal 300 and 302 spot welded together to form a double thickness flange 304. Two trapezoidally shaped legs 306 and 308 are bent at right angles from clip member 262, and a similar leg 310 is bent from member 302. As best shown in FIGURES 19 and 21, legs 306 and 308 lie in the same plane; and leg 310 lies in a plane below legs 306 and 308.

Radiant grid supporting clips 298 are fixed to the fuel-air distribution tubes 252 of infrared generators 202 and 204 by studs 270, which extend through apertures 312 in the flanges 304 of the clips, and retainers 274, which clamp clips 298 against the flanges 290 of distribution tubes 252.

As is best shown in FIGURES 7 and 12, with infrared generators 202 and 204 assembled, two legs 306 and 308 of each clip 298 extend over the upper surface of the associated flange 290 of radiant grid 248; and clip legs 310 engage the lower side of the associated flanges, thus supporting the radiant grids from the associated fuel-air mixture distribution tubes 252. The distance between the two sets of grid clip legs is preferably slightly greater than the thickness of flanges 290. This permits longitudinal movement of flanges 290 between the legs of the clips as the parts expand and contract due to temperature changes, but restrains flanges 290 and the bodies of grids 248 and 250 from appreciable transverse movement. This permits grids 248 and 250 to expand axially as the temperature increases, which prevents them from becoming distorted as they expand and contract longitudinally. Lateral expansion is accommodated by the horseshoe configuration of the grid.

A fourth triangular leg 314 is bent from each clip member 302 in the plane of upper legs 306 and 308 and in the opposite direction therefrom. As shown in the figures just mentioned, with infrared generators 202 and 204 assembled, clip legs 314 underlie and further support orifice grids 254.

In the illustrated embodiment of the present invention, six pairs of grid clips 298 are employed to attach the two radiant grids 248 and 250 of each generator in end-to-end relationship to its line burner 246. The pairs of clips 298 are spaced uniformly (about six inches apart) the length of the associated distribution tube 252 with one of the clips of each pair on each side of the distribution tube and with three pairs of clips supporting each radiant grid. This particular arrangement is not critical, however, and may be varied as desired for different applications of the principles of the present invention.

The infrared generators 202 and 204 just described are removably supported in heater casing 206 by combustible mixture supply conduits 316 and 318 incorporated in the combustible mixture supply system 208, which will be described in more detail later, and by hangers 320 fixed, as by screws 322, to the top wall 242 of casing member 214. Combustible mixture supply conduits 316 and 318 extend from blower-control compartment 224 through partition 220, distribution tube end plates 260, and gaskets 286 into the two fuel-air mixture distribution tubes 252 and support the ends of infared generators 202 and 204 nearest partition 220.

Hangers 320, which support the ends of the infrared generators nearest casing end cover 216, extend from adjacent one side wall 228 of U-shaped casing member 214 to adjacent the other side wall 230 and have an inverted hat-shaped cross section providing a laterally extending flange 324 to the bottom of which the end portions 326 of a generator supporting strap 328 are fixed as by welding. The central portion 330 of each strap 328 is offset from its end portions 326 (see FIGURE 12) and, therefore spaced from the associated hanger flange 324. This forms a slot 332 into which the mounting leg 278 of the end bracket 258 of the associated infrared generator 202 or 204 slidably extends.

Either or both of the two infrared generators 202 and 204 can be readily removed from infrared generator compartment 222 for servicing or replacement by simply loosening bolts 238, swinging end cover 216 open about screws 226, and sliding the desired generator (or both generators) out of the burner compartment. The infrared generators are replaced by reversing the foregoing steps and their sequence.

The arrangement just described is a novel and important feature of the present invention as it materially simplifies the removal of the infrared generators for maintenance or replacement. As a consequence, heaters constructed in accord with the principles of the present invention are much less expensive to maintain than those heretofore available.

When end cover 216 is closed, infrared generators 202 and 204 are properly positioned in infrared generator compartment 222 and prevented from moving longitudinally in casing 206 in a direction toward blower-control compartment 224 by the engagement of infrared generator supporting straps 328 with the closure forming legs 278 of the infrared generator end brackets 258. Movement in the opposite direction is prevented by L-shaped brackets 334 (only one of which is shown in FIGURE 11) having horizontally extending legs 336 fixed, as by welding, to a heat shield 338 attached to end cover 216. Vertically oriented legs 340 of brackets 334 engage the closure forming legs 278 of end brackets 258 and prevent the infrared generators from sliding toward the closed end cover.

The arrangement just described also prevents end cover 216 from being completely closed unless infrared generators 202 and 204 are correctly positioned in the infrared generator compartment 222 of casing 206. This is an important safety feature of this invention as, if end cover 216 cannot be completely closed, it is an indication that the infrared generators are not properly positioned and that the heater cannot be safely operated.

The infrared energy emitted from radiant grids 248 and 250 is concentrated into a beam of the desired configuration and projected in the desired correction by generally semiparabolic side reflectors 342 and 344 (see FIGURE 8) on opposite sides of infrared generators 202 and 204 and by pairs of generally horizontally extending top reflectors 346 and 348 incorporated in each of the infrared generators 202 and 204. The upper edges of the side reflectors 342 and 344 (which extend the length of infrared generator compartment 222) are fixed to the top wall 242 of U-shaped casing member 214 by U-shaped brackets 350 (three for each reflector). Brackets 350 have legs 352 riveted to casing member top wall 242, downwardly extending legs 394 spaced outwardly from infrared generators 202 and 204, and outwardly inclined flanges 354 at the bottoms of legs 352, to which reflectors 342 and 344 are bolted.

The lower edges of reflectors 342 and 344 are fixed to the side walls 228 and 230 of heater casing member 242 by V-shaped brackets 358. These brackets have upper legs 360 riveted to the reflectors and lower legs 362 which rest in grooves provided by inwardly and then upwardly extending flanges 364 at the lower edges of U-shaped casing member side walls 228 and 230.

As best shown in FIGURE 8, side reflectors 342 and 344 are supported in spaced relation to the side walls 228 and 230 of U-shaped casing member 214 by the novel mounting arrangement just described. This provides open ended, generally vertical, cooling air passages 366 extending the length of infrared generator compartment 222. Air flows from the open lower side of casing 206 into and upwardly through passages 366 and along the bottom of casing member top wall 242. The cooling air reduces the temperature of reflectors 342 and 344 and U-shaped casing member side and top walls 228, 230, and 242, preventing these components from being overheated by radiant energy emitted from infrared generators 202 and 204 and by circulation of combustion products exhausted from the generators.

Each of the reflectors 346 and 348 (which also extend the length of infrared generator compartment 222) is a generally L-shaped member having a vertical mounting leg 368 and an upwardly inclined reflecting leg 370 (see FIGURE 19). Reflectors 346 and 348 are fixed to the distribution tubes 252 of infrared generators 202 and 204 by studs 270 and retainers 372. Reflectors 346, which have relatively narrow reflecting legs, are attached to the adjacent facing sides of the generators; and reflectors 348, which have materially wider reflecting legs, are attached to the outer, oppositely facing sides of the generators (see FIGURE 8).

As best shown in FIGURE 8, there are passages 374 extending the length of infrared generator compartment 222 between each of the semiparabolic side reflectors 342 and 344 and the nearer of the outer top reflectors 348 and a similar passage 376 between the two inner top reflectors 346, which permit combustion products flowing from the combustion zones 255 of infrared generators 202 and 204 through the openings in radiant grids 248 and 250 to rise upwardly through infrared generator compartment 222 to the space above the reflectors. This flow is encouraged by the upward inclination of the reflecting legs 370 of top reflectors 346 and 348. At the same time, as shown in FIGURE 8, the upper portions of semiparabolic reflectors 342 and 344 overlap the two outside top reflectors 348 so that there is substantially no loss of radiant energy through passages 374. The gap 376 between inner top reflectors 346 is sufficiently small that the loss of radiation through this passage is negligible.

From the space above the reflectors, the combustion products are vented from infrared generator compartment 222 through a flue collar 378 which extends through an aperture 380 in the top wall 242 of U-shaped casing member 214 to which flue collar 378 is locked integrally formed beads 382.

To prevent rain from entering heater compartment 222 through flue collar 378, a U-shaped rain cover 384 is fixed as by screws 386 to casing top wall 242 (see FIGURE 8). Rain cover 384 is of generally the same width as flue collar 378, but has a length substantially longer than the flue collar diameter, which effectively prevents even a driving rain from entering the open upper end of the flue collar and provides openings between the upper end of the flue collar and the rain cover for the escape of combustion products.

The arrangement just described is employed in applications of heaters 200 where venting of the combustion products is not required. If venting is required, the alternate arrangement illustrated in FIGURE 10 is employed. Referring now to the latter figure, the arrangement shown in this figure is similar to that shown in FIGURE 9 except that U-shaped hood 388, which is similar to the U-shaped rain cover 384 of FIGURE 9, is provided with an aperture 390 through which a second flue collar 392 extends directly above flue collar 378. Flue collar 392 is locked to hood 388 by beads 394 formed in the collar.

As shown in FIGURE 10, flue collar 388 is adapted to be connected to a flue pipe 396 depicted in phantom lines.

Mounted directly below the lower open end of flue collar 388 and midway between it and the upper end of collar 378 is a circular baffle 398 which is preferably slightly smaller in diameter than flue pipe 396 (which will typically be on the order of eight inches in diameter). Z-shaped brackets 400, fixed, as by spot welding, to baffle 398 and to the bottom of U-shaped casing member top wall 242, support baffle 398 from casing 206.

When heater 200 is in operation, combustion products generated by combustion in infrared generators 202 and 204 flow upwardly through flue collar 378 and are diverted outwardly by baffle 398 where they mix with air flowing into hood 388 through its open ends 402. This is highly advantageous in that the addition of relatively cool air from the surrounding atmosphere materially reduces the temperature of the combustion products before they enter flue pipe 396 and therefore prevents the flue pipe from being overheated. In addition, baffle 398 prevents the disturbance of the combustion in infrared generators 202 and 204 by excessive draft in flue 396 or by downdrafts through the flue.

As discussed previously, heating of side reflectors 342 and 344 and the top and side walls of U-shaped casing member 214 by heat given off from infrared generators 202 and 204 is minimized by the circulation of ambient air through channels 366 between side reflectors 342 and 346 and the casing member side walls. To prevent the operation of infrared generators 202 and 204 from unduly raising the temperatures of heater casing end cover 216 and partition 220 and to prevent overheating of the components of heater control system 210, heater 200 is provided with the heat shield 338 mentioned previously and heat shields 404 and 406.

As shown in FIGURES 9 and 11, heat shield 338 is fixed to heater casing end cover 216 by a Z-shaped spacer 408. The spacer is attached to the end cover and to the heat shield as by welding and supports the heat shield in parallel spaced relation to the end cover, providing a cooling air passage 410 therebetween. The lower end of passage 410 communicates with the ambient atmosphere through the open side 212 of heater casing 206. Thus, cooling air can flow through the open side 212 of radiant heater 200 and upwardly through passage 410 to cool burner casing end cover 216. At the upper end of passage 410, the cooling air is discharged from heater compartment 222 through an outlet 412 between heater casing top wall 242 and the upper edge of end cover 216.

Referring now to FIGURE 13, heat shields 404 and 406 are fixed to the partition 220 dividing casing 206 into compartments 222 and 224 by bolts 414, nuts 416, and spacers 418, which maintain the two heat shields and partition 220 in a parallel spaced apart relationship providing two cooling air passages 420. These passages, like the passage 410 just described, communicate with the ambient atmosphere at their lower ends through the open side 212 of casing member 214. The upper ends of the two heat shields 404 and 406 are spaced about one inch below casing top wall 242, providing outlets from which the air can flow from passages 420 into flue collar 378. Air flowing upwardly through channels 420 removes heat which would otherwise be transmitted to blower-control compartment 224 and subject heat sensitive components of heater control system 210 to overheating.

To further minimize heating of the components in control system 210, air is circulated through blower-control compartment 224. As shown in FIGURE 9, casing end cover 218, which is at one end of compartment 224, has an upper edge which terminates below casing top wall 242, providing an outlet passage 422 from blower-control compartment 224 to the ambient atmosphere. Cooling air circulates from the ambient atmosphere through the open lower side 212 of casing member 214 upwardly through the blower-control compartment and out passage 422 to assist in maintaining the heat sensitive blower-control components in compartment 224 from overheating.

One of the novel and important features of the present invention is use of a grill or grate 424 (see FIGURES 6 and 8) across the open side 212 of heater casing 206 to prevent air circulating across the opening from cooling radiant grids 248 and 250 of infrared generators 202 and 204 and thereby decreasing heater efficiency. The use of grate 424 also assures instant ignition of the combustible mixture, even through a strong wind is blowing on the heater. As mentioned previously, this feature contributes to the unique capabilities of the present invention which permit it to be used in drafty locations or out-of-doors.

Referring now to the figures just mentioned, grill 424 is of honeycomb or egg-crate configuration and is fabricated of intersecting aluminum strips 426 having a width on the order of one-half inch arranged on edge in normally disposed rows to form openings one-half inch square and one-half inch deep. This novel construction passes all but an insignificant portion of the radiation impinging on it, either directly or by reflection from the strips, and yet effectively shields infrared generators 202 and 204 from the effect of air currents.

As best shown in FIGURE 8, grill 424 is supported on the lips of the flanges 364 bent from the lower edges of casing side walls 228 and 230. The intermediate legs 428 of the Z-shaped side reflector mounting brackets 358 rest on the upper side of grate 424 and hold it against flanges 364.

Referring now to FIGURES 13–16 and 18, the combustible mixture supply system 208 of radiant heater 200 includes a combustion air blower 430 driven by an electric motor 432, a fuel supply conduit 434, a mixing chamber 436 in which the fuel and combustion air are mixed, and the previously mentioned combustible mixture supply conduits 316 and 318 which conduct the combustible mixture into distribution tubes 252 of infrared generators 202 and 204.

As best shown in FIGURES 13, 15, and 17, mixing chamber 436 is a generally rectangular, open sided box and is fixed by bolts or rivets to the transverse partition 220 of heating casing 206. Fixed across the open side of mixing chamber 436 is a sheet metal cover 438 which abuts the free edges of side walls 442, bottom wall 444, and top wall 446 of the mixing chamber. A flange 440, extending around the periphery of cover 438, engages the outer surfaces of the above-mentioned mixing chamber walls.

Cover 438 is fixed to mixing chamber 436 by screws 448 which extend through the cover and are threaded into angles 450 fixed to the interior of the mixing chamber side walls 442 as by brazing.

A gasket 452 extending around the periphery of mixing chamber 436 between mixing chamber walls 442, 444, and 446 and cover 438 seals the joint between mixing chamber 436 and its cover.

Combustion air blower 430, which is of conventional construction, has an outlet 454 terminating in a flange 456 fixed by bolts 458 and nuts 460 to the cover 438 of mixing chamber 436 and to a restrictor plate 462 (see FIGURE 14) disposed in mixing chamber 436 on the opposite side of cover 438 from the combustion air outlet. Formed in restrictor plate 462 are superposed 7/8" diameter apertures 464 through which the combustion air flows from blower 430 into mixing chamber 436 and which correlate the flow of combustion air into the mixing chamber to the flow of fuel. The size of these apertures may and preferably will be varied to provide the proper amount of combustion air for different fuel supply rates and different types of fuels. The combustion air thus supplied to mixing chamber 436 enters blower-control compartment 224 through the open lower side 212 of heater casing 206 and flows upwardly through the compartment into the blower inlet.

A gasket 466, disposed between cover 438 and restrictor plate 462 and provided with apertures (not shown) equal in diameter and in the same location as the apertures 464 in the restrictor plate, prevents leakage at the joint between combustion air blower 430 and mixing chamber cover 438.

The previously mentioned fuel supply conduit 434 in combustible mixture supply system 208 extends downwardly (see FIGURE 18) through a rubber weatherproofing grommet in an aperture 470 in casing top wall 242 into the interior of blower-control compartment 224 and then upwardly through the bottom wall 444 of mixing chamber 436 into its interior. Fixed to the end of conduit 434 in mixing chamber 436 is a T-shaped manifold 472 fastened to mixing chamber bottom wall 444 by screws 474. Orifice members 476 are threaded on the oppositely directed outlets 478 of manifold 472. The orifice members increase the velocity of the fuel as it flows from conduit 434 into the mixing chamber and directs the fuel into the stream of air flowing into the mixing chamber through restrictor plate 462 to insure thorough mixing of the fuel and air.

A manual value 480 (see FIGURE 18) is preferably incorporated in fuel supply conduit 434 on the outside of heater 200 to permit the flow of gas to the heater to be shut off when the heater is to be installed or removed or out of use for extended periods, for example. A conventional pressure regulator 482 and a solenoid valve 484 are interposed in fuel conduit 434 in blower-control compartment 224 to reduce the pressure of the fuel and to control the flow of the fuel into mixing chamber 436 during normal operation.

As mentioned previously, combustible mixture supply system 208 includes, in addition to the components just described, combustible mixture supply conduits 316 and 318 which conduct the combustible mixture formed in mixing chamber 436 to the distribution tubes 252 of infrared generators 202 and 204. Conduits 316 and 318 are brazed to the wall 486 of mixing chamber 436 opposite cover 438 and communicate with the interior of the mixing chamber through apertures 488 in wall 486. From mixing chamber 436, the conduits, which are symmetrically disposed relative to apertures 464 in restrictor plate 462, extend through aligned apertures 490, 492, 494, 496 and 498 (see FIGURE 13) in casing partition 220, heat shields 406 and 404, and the end plates 260 and gaskets 286 of infrared generators 202 and 204 into distribution tubes 252. The apertures in end plates 260 and gaskets 286 are closely dimensioned to prevent leakage of the combustible mixture through these apertures around the conduits.

Referring now to FIGURES 13 and 15, the control system 210 of radiant heater 200 may be identical to the control system 48 described above in conjunction with radiant heater 40 and illustrated in FIGURE 5 except as follows.

First, control system 210 includes a damper 500 disposed in the outlet of blower 430 and fixed to a shaft 502 pivotably supported by and extending through the side walls of blower outlet 454. By rotating shaft 502, damper 500 can be pivoted between a maximum flow position, in which it engages a stop 504 fixed to the bottom wall 506 of blower outlet 454 (see FIGURE 15), and a minimum flow position (shown in dotted lines in FIGURE 15) in which damper 500 strikes blower casing bottom wall 506.

Damper 500 is automatically pivoted from its dotted line minimum flow position, which provides a rich starting mixture, to its full line maximum flow position to provide a relatively lean running mixture, which will provide optimum efficiency and complete combustion, as the temperature of infrared generators 202 and 204 increases to normal operating temperature. This is accomplished by a bimetallic operator or actuator 508 having an L-shaped configuration. The shorter leg 510 of bimetallic operator 508 is fixed to the side of heat shield 404 facing the interior of infrared generator compartment 222 by a screw 512 which extends through actuator leg 510, heat shield 404, and the legs of a U-shaped retainer 514 in an aperture 516 in heat shield. An insulating pad 518 is preferably clamped between actuator leg 510 and the nearest retainer leg to prevent the transfer of heat from shield 404 to the actuator leg by conduction.

The shorter bimetallic operator leg 510 responds to increasing and decreasing temperatures within infrared generator compartment 222; and the compartment temperature, in turn, increases and decreases as the temperatures of infrared generators 202 and 204 increase and decrease. Heat transferred to bimetallic operator leg 510 is transferred by conduction to the longer operator leg 520, which extends through aperture 516 in heat shield 404 and aligned apertures 522 and 524 in heat shield 406 and transverse partition 220 into blower-control compartment 224. At its free end, bimetallic operator leg 520 extends through an aperture (not shown) in the upper end of an inextensible link 526 connected at its lower end to a crank arm 528 integrally formed on one end of damper shaft 502 (see FIGURE 13).

With radiant heater 200 off, bimetallic operator 508 and damper 500 are in the minimum air flow position shown in dotted lines in FIGURE 15. As the temperature of infrared generators 202 and 204 increases, bimetallic operator leg 520 is heated and moves upwardly, rotating damper 500 in a counterclockwise direction (as viewed in FIGURE 15) until it reaches the maximum flow position.

The manipulation of dampers 500 from the minimum flow, rich starting mixture position to the maximum flow, lean running mixture position is therefore automatically accomplished with an extremely simple mechanism, a further advantage of radiant heaters constructed in accord with the principles of the present invention over those heretofore available.

Also incorporated in the control system 210 of radiant heater 200 is a spark plug 530 of novel construction which is another important feature of the present invention. The spark plugs heretofore available for use in apparatus of the type disclosed herein, which were the automotive type, the single electrode type, and the grounded electrode type, have all been relatively unsatisfactory. Automotive plugs, for example, are too expensive and too bulky to be satisfactory for use in radiant heaters of the type to which the present invention relates.

In single electrode spark plugs, the spark gap is between an energized electrode and a portion of the infrared generator itself. It is too difficult to maintain a proper spark gap with this construction to make it satisfactory for radiant heater applications.

In the heretofore available grounded electrode spark plugs, two long rod-like electrodes, one energized and one grounded, are mounted in closely spaced side-by-side relationship. Again, it is extremely difficult to maintain the correct spark gap; and, moreover, in this type of spark plug the energized electrode can easily contact metal burner components, short circuiting the spark gap and making the apparatus in which it is incorporated inoperative.

The novel spark plug type igniter 530 employed in the present invention, which has none of the foregoing drawbacks, includes a rod-like energized electrode 532, a hairpin-shaped grounded electrode 534, and a cylindrical ceramic body 536 (see FIGURES 23–27). As best shown in FIGURES 24 and 26, energized electrode 532 extends through a central bore 538 in spark plug body 536; and its ends protrude from opposite ends of the spark plug body. A sleeve 540 fixed on electrode 532 as by silver soldering positions it centrally in bore 538. Intermediate its ends, the diameter of bore 538 is decreased to provide an annular shoulder 542. Electrode 532 is prevented from moving downwardly relative to the spark plug body (with the spark plug oriented as shown in FIGURE 24) by the engagement of the end of sleeve 540 with shoulder 542. Movement of electrode 532 in the opposite direction relative to spark plug body 536 is prevented by a nut 546 threaded on electrode 532 and engaging the end of body 536. A second nut 548 threaded on electrode 532 clamps a conventional terminal 550 against nut 546 to provide an electrical connection between electrode 532 and the source of operating voltage.

The hairpin-shaped grounded electrode has legs 552 which, in the assembled spark plug, are symmetrical relative to electrode 532 and are brazed to a plate 554 having a central aperture 556 of substantially the same diameter as spark plug body 536 through which the spark plug body extends.

Assembled on spark plug body 536 adjacent plate 554 are two members 558 (see FIGURE 27) which, together, constitute a split plate 560 similar in configuration to plate 554. Plate members 558 have semicircular slots 562 which, together, define a circular aperture of the same diameter as the inner end of an annular groove 564 in and extending around spark plug body 536.

Surrounding spark plug body 536 adjacent split plate 560 is a third plate 566 which is similar to plate 554. Plate 566 has slightly smaller outside dimensions than plate 554 and, like the latter, a central aperture 568 of substantially the same diameter as spark plug body 536. Plates 554, 560, and 566 are tack welded together into a unitary structure which, because of the engagement between split plate 560 and the annular groove 564 in spark plug body 536, fixedly positions grounded electrode 534 longitudinally of spark plug body 536.

The foregoing arrangement provides a spark gap 570 (see FIGURE 24) between the end of energized electrode 532 and the web 572 connecting the two legs 552 of grounded electrode 534.

Two advantages of the novel spark plug type igniter just described are that it is inexpensive and has a spark gap which can be easily adjusted and readily maintained. Also, the novel configuration and disposition of the hairpin configured grounded electrode 534 prevent energized electrode 532 from touching any burner component and thereby shorting out the plug and, also, prevents the energized electrode from being bent or otherwise damaged by contact with a burner component or other object. Furthermore, the spark plug can be rigidly and positively positioned with spark gap 570 located directly in the stream of combustible mixture it is desired to ignite.

Referring now to FIGURE 15, the novel spark plug 530 just described is fastened to the transverse partition 220 of radiant heater casing 206 by screws 574, which extend through plates 554, 560, and 566 into partition 220. Spark plug 530 is oriented so the end of energized electrode 532 to which terminal 550 is fastened extends into blower-control compartment 224.

The opposite end of energized electrode 532 and grounded electrode 534 extend through heat shields 406 and 404 and an aperture 576 in the end member 296 of the radiant grid 250 of infrared generator 202 into its combustion zone 255. This positions spark gap 570 directly in the path of the combustible mixture flowing through orifice grid 254 into the combustion zone.

Current conveyed through terminal 550 to electrode 532 flows through the electrode, across spark gap 570, and through electrode 534, which is grounded to heater casing 206 through plate 554, causing a spark across gap 570 which ignites the combustible mixture flowing through into the combustion zone.

Welded or otherwise fixed to the apertured end plate 296 of the radiant grid 250 through which the electrodes 532 and 534 of spark plug 530 extend is a horseshoe-shaped clip 578 (see FIGURES 15 and 16). As best shown in FIGURE 15, the upper ends of the clip legs are bent to form offset ears 580, which clamp distribution tube end plate 260 against the radiant grid end plate 296. This prevents radiant grid 250 from moving relative to the spark plug as it expands and contracts and thereby varying the distance electrodes 532 and 534 extend into the radiant grid and therefore insures proper positioning and operation of the plug.

Referring now to FIGURE 17, control system 210 also includes a flame detector 582, which may be identical to the flame detector SD described above in conjunction with the embodiment of FIGURE 1. The capillary fluid filled tube 584 of flame detector 582 extends through aligned apertures 586 in casing partition 220 and heat shields 406 and 404 into parallel spaced relation to the lower edge of the radiant grid 250 of infrared generator 204. Capillary tube 584 is supported in the disposition just described by a vertically extending sheet metal strap welded to radiant grid end plate 296 and extending about one-half inch below the grid. Adjacent its lower end, strap 588 is provided with an aperture 590 through which capillary tube 584 extends.

As best shown in FIGURE 17, the loops 292 of radiant grid 250 are removed in the area above capillary tube 584. This is a novel and important feature of the present invention as it permits the flame detector to respond rapidly to the beginning and termination of combustion in the combustion zone 255 within radiant grid 250.

Directly beneath capillary tube 584 is a trough-shaped shield 592 fixed to heat shield 404 as by screws 594, which extend through ears 596 formed at the end of shield 592 adjacent heat shield 404 into the heat shield. Shield 592 insures the proper operation of the flame detector by shielding capillary tube 584 from the influence of drafts and other conditions which might cause a false response.

Except as indicated otherwise previously, the components of control system 210 are mounted on a tray 598 in the lower portion of compartment 224. Tray 598 rests on and is fixed to cross angles 600 riveted to the side walls 228 and 230 of U-shaped casing member 214.

In this embodiment of the present invention, the leads from the external power source are connected to the heater in a junction box 602 fixed to the top wall 242 of U-shaped casing member 214. From junction box 602, leads 604 extend to a terminal block 606 mounted in blower-control compartment 224. The connections from the electrical components in compartment 224 are all made to terminal block 606. This facilitates the removal of individual electrical components for servicing or replacement and, as a practical matter, removes the danger that a serviced or new unit will be incorrectly hooked up when it is installed.

As mentioned previously, the operation of radiant heater 200 is similar to the operation of radiant heater 40. The differences in operation, due to the control system components of heater 200 just described, are as follows: when heater 200 is cold, the damper 500 in the outlet 454 of combustion air blower 430 is in its minimum flow position to provide a fuel-rich combustible mixture; and solenoid valve 484 is closed. Operation of heater 200 is initiated by the closing of a manual or thermostatically operated switch (or a switch operated in any other manner) to complete a circuit to and energize the solenoid of valve 484 and the motor 432 of combustion air blower 430. This permits the fuel to flow from conduit 434 through pressure regulator 482 and valve 484 into mixing chamber 436, where it is mixed with air flowing into the combustion chamber through the outlet 454 of blower 430. The rich starting mixture thus formed in mixing chamber 436 flows through combustible mixture supply conduits 316 and 318 into the distribution tubes 252 of infrared generators 202 and 204 and through the orifice grids 254 of the two generators to their combustion zones 255.

At the same time that the solenoid valve and blower motor energizing circuits are completed, operating voltage is applied to the energized electrode 532 of spark plug 530, providing a spark across the spark gap 570 located in the combustion zone 255 of infrared generator 202. Consequently, the combustible mixture is first ignited in infrared generator 202. As soon as this generator is ignited, it ignites the combustible mixture of infrared generator 204, causing the flame detector capillary tube 584 to be heated and deenergize the ignition circuit. Also, as the infrared generators 202 and 204 heat up, bimetallic actuator 508 rotates damper 500 from its minimum flow position to its maximum flow position to increase the ratio of air to fuel in the combustible mixture and provide a lean operating mixture of optimum efficiency.

The operation of infrared heater 200 is otherwise the same as that of infrared heater 40; and it is, therefore, not believed to be necessary to describe it in more detail, particularly as the control system, by itself, forms no part of the present invention and as other control systems may be substituted for that illustrated in FIGURE 5, if desired.

One of the most important features of the operation of infrared heater 200 is the mutual heating effect of infrared generators 202 and 204 on each other. Because of their adjacent, side-by-side mounting, the hot combustion products discharged through the apertures in the radiant grids 248 and 250 of each of the two generators heat the radiant grids of the other infrared generator; and there is also a mutual transfer of heat between the radiant grids of the two infrared generators by radiation. Because of the transfer of heat between the two infrared generators, radiant grids 248 and 250 may be maintained at the same temperature with a lower combustible mixture input than is required in a single generator heater of comparable capacity. Specifically, it has been found that, by employing the novel dual generator arrangement utilized in heater 200, fuel consumption may be reduced by at least four percent over that required to obtain the same radiant grid temperature in a single generator heater of the type described above. In addition, radiant grid temperatures are more uniform in the side-by-side infrared generator arrangement because, as the radiant grids of one generator become hotter than those of the other, there is a transfer of heat by radiation to the cooler radiant grids and a consequent equalization of grid temperatures.

The novel radiant heater 200 just described is attached to suitable supporting structure (not shown) by Z-shaped hanger brackets 608 and 610 (see FIGURES 6, 9, and 11). Hanger brackets 608 and 610, which substantially span the ends of radiant heater 200, are attached at opposite ends of the heater to the top wall 242 of U-shaped casing member 214. This may be done by welding the intermediate legs 612 of the brackets to the casing, which the hanger brackets reinforce to a significant extent. The upper, vertically extending, mounting legs 614 of the brackets are provided with apertures 616 (see FIGURE 6) through which bolts or other fasteners are inserted to attach the mounting legs to the heater supporting structure.

The lower leg 618 of bracket 608 extends downwardly at an angle over and spans end cover 216 at the end of infrared generator compartment 222, preventing rain from entering the outlet passage 412 between the upper edge of end cover 216 and the top wall 242 of casing member 214. The third, downwardly leg 620 of mounting bracket 610 (see FIGURE 9) is similarly configured to extend down over the outlet opening 422 between the upper edge of casing end cover 218 and the top wall 242 of U-shaped casing member 214 to prevent rain and other precipitation from entering blower-control compartment 224 through the outlet opening.

Referring now to FIGURE 9, to even further minimize the possibility of rain or other precipitation entering infrared generator compartment 222 through passage 412, a depending flange 622 is formed on infrared generator mounting bracket 320. Flange 622 imparts to passage 412 a labryrinthine configuration which effectively prevents the entrance of precipitation, but does not significantly affect the outward flow of cooling air.

*Second single generator heater embodiment*

The radiant heater 700 illustrated in FIGURES 28–30 is similar to the radiant heater 40 of FIGURES 1–5 and the radiant heater 200 of FIGURES 6–27. To the extent that the heater 700 is like those described previously, the same reference characters will be employed to describe corresponding components.

Radiant heater 700 differs from heater 40 primarily in the configuration and construction of the reflectors 702 and 704 employed to concentrate and direct the infrared radiation emitted from the radiant grid 706 of infrared generator 708 (which is preferably of the type described previously in conjunction with the radiant heater 200 of FIGURES 6–27). In this embodiment of the present invention, reflectors 702 and 704, which are preferably fabricated of aluminum, are of the same apertured construction as radiant grid 706. The downward facing reflecting surfaces 710 of the two reflectors function with substantially the same degree of efficiency as a solid reflector and, at the same time, provide apertures through which the combustion products can pass from infrared generator 708 upwardly through heater casing 44 and out flue collar 96.

Reflectors 702 and 704 are removably mounted in casing 44 on opposite sides of infrared generator 708 by lips 712 at the bottom of casing side walls 714 and by burner reflectors 716. Lips 712 form grooves 718 in which the lower edges of the reflectors are seated.

Burner reflectors 716 are fastened to the infrared generator's distribution tube 720 by studs 70, which extend through upper legs 724 of the clips, and retainers 72, threaded on the studs. Reflectors 724 have downwardly inclined reflecting legs 727 to the undersisde of which Z-shaped straps 728 are fixed, as by brazing. Reflector legs 727 and straps 728 form recesses into which the upper edges of the reflectors extend.

The spacing of straps 728 along reflectors 716 can be varied as desired, depending upon the characteristics of a particular heater.

Another feature of radiant heater 700 is a plate 730 of the apertured construction just described across the open bottom of blower-control compartment 62 to admit combustion air to this compartment and combustion air blower 164. Plate 730 is removably supported across the compartment bottom in channels 732 fixed, as by welding or brazing, to transverse casing partition 58 and to casing end cover 56.

Radiant heater 700 also differs from radiant heater 40 in that the former employs end members 258 and hangers 320 of the type shown in FIGURE 11 to attach both ends of infrared generator 708 to casing 44. This arrangement may prove preferable in certain applications of the present invention where maximum support of the infrared generator is desired.

Radiant heaters 40 and 700 also differ in structural details such as the construction of U-shaped casing member 44 which is unitary in heater 40 and formed of a top member 734 and the side members 714 mentioned previously in radiant heater 700. Side members 714 and top member 734 are fastened together by screws 736 which extend through flanges 738 at the top of side wall members 714 into flanges 740 at the ends of top member 734.

In main part, radiant heater 700 has the same advantages over the prior art as the radiant heater 40 described previously. In addition the use of the type of infrared generator described above in conjunction with the dual generator embodiment of the present invention and reflectors and a combustion air inlet screen of the apertured construction described above may make heater 700 more suitable for particular applications of the present invention.

Like heater 40, heaters 200 and 700 may be modified to a substantial extent without exceeding the scope of our invention. Several modifications are suggested in the foregoing detailed description of heaters 200 and 700. Other modifications will readily occur to those skilled in the arts to which this invention relates. Such modifications of the illustrated exemplary structure are fully intended to be encompassed by the appended claims except as expressly excluded therefrom.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A fluid fuel-fired heater, comprising:
   a. an elongated casing and a transverse partition dividing said casing into first and second compartments;
   b. infrared generator means in said first compartment extending substantially the length thereof;
   c. combustible mixture supply means in said second compartment for supplying a controlled combustible mixture of fuel and air to said infrared generator means;
   d. said generator means including:
      (1) elongated fuel-air mixture distribution means for distributing the combustible mixture supplied to said infrared generator means by said combustible mixture supply means to a plurality of combustion zones adjacent said distribution means and extending substantially the length of said infrared generator means; and
      (2) radiant means on the side of said combustion zones opposite said distribution means adapted to be heated to incandescence by combustion of said mixture;
   e. said first compartment having an open side extending the length of said infrared generator means on the same side thereof as said radiant means through which infrared radiation emitted from said radiant means can pass.

2. The heater of claim 1, together with a grating extending across the open side of said casing, said grating being composed of thin, flat intersecting members dividing said open side into a plurality of small openings and extending generally perpendicular to the plane of said open side to prevent wind blowing across the opening from cooling the infrared generator with minimal interference with the emission of infrared radiation from said generator.

3. The heater of claim 1, wherein said ignition means includes a high voltage transformer and a spark plug connected to the secondary winding of said transformer, the spark gap of said plug being located adjacent said distribution tube in the path of the combustible mixture flowing to said combustion zone therefrom.

4. The heater of claim 1, wherein said combustible mixture supply means comprises:
   a. fuel conduit valve means;
   b. a flame detector adapted to be subjected to heat liberated by the mixture burning in said combustion zone; and
   c. means operatively interposed between said valve means and said flame detector and responsive to said flame detector for closing said valve means and cutting off the flow of fuel to the generator if the temperature of said flame detector fails to rise to a given level in a predetermined time after said valve means is opened or if the temperature of said flame detector decreases below said level thereafter.

5. The infrared heater of claim 1:
   a. wherein the heater casing has an opening in one end thereof; and including
   b. means slidably supporting said generator means in said casing; and
   c. closure means adapted to extend across the opening in said casing and fixedly position said generator means relative to said casing, said closure means being movable to an open position to permit said generator to be slidingly removed from said casing through the opening in the end thereof.

6. The infrared heater of claim 1, together with:
   a. control means for said infrared generator means in said second compartment; and
   b. means for shielding said control means from heat emanating from said infrared generator disposed in said first compartment between said partition and said infrared generator.

7. The infrared heater of claim 1, together with:
   a. reflectors substantially coextensive in length with said first compartment extending laterally from the open side of said casing to adjacent said radiant means;
   b. said casing having an opening for combustion products in the side thereof opposite the open side, said radiant means and said reflectors being apertured for the passage of combustion products from a combustion zone within said grid through the grid and reflectors and through said exhaust opening.

8. The infrared heater of claim 1, wherein said fuel-air mixture distribution means is comprised of two parallel, spaced apart distribution tubes.

9. The infrared heater of claim 8:
   a. wherein said radiant means comprises a radiant grid fixed to each of said distribution tubes and extending the length thereof, the radiant grid being configured to define a space between it and the associated distribution tube extending the length of said grid and said tube, said combustion zones being located within the space thus defined;
   b. said grids having apertures therethrough in the more closely spaced portions thereof, whereby combustion products flowing from the combustion zones in each of said grids through the apertures therein will impinge upon and wipe across the other of said grids, the combustion in each of said zones thereby being effective to raise the radiant grid temperature and increase the heat output of the grid surrounding the other of said combustion zones without increasing the rate of consumption of the combustible mixture.

10. The infrared heater of claim 9, wherein the space between the closely juxtaposed radiant grids of adjacent heaters is unobstructed, whereby there is a mutual exchange of infrared radiation between said grids to maintain them at substantially the same temperature.

11. The infrared heater of claim 1, together with ignition means energizable to ignite said mixture in one of said combustion zones and flame sensing means for detecting the presence of flame in another of said combustion zones.

12. The heater of claim 11, wherein said ignition means is a spark plug which comprises:
   a. a ceramic body extending through and fixed to said partition;
   b. a first rodlike electrode extending through the center of the ceramic body into said one combustion zone at one end and at the other into the second compartment for connection to an electrical power source;

c. a second hairpin shaped electrode fixed to said ceramic body and having first and second legs symmetrically disposed on opposite sides of the first electrode and an integral portion connecting said legs disposed in spaced relation to said one end of the first electrode to provide a spark gap therebetween;

d. means adapted to provide metal-to-metal contact between said second electrode and said partition to thereby ground said second electrode.

13. The infrared heater of claim 11:

a. wherein said flame detecting means includes a capillary tube extending from said second compartment through said partition into said other combustion zone in parallel spaced relationship to the radiant means of said infrared generator means;

b. wherein there are a plurality of unobstructed apertures in said radiant means extending substantially the length of said capillary tube to increase the sensitivity of said tube to the presence and absence of combustion in said other combustion zone; and c. including a trough shaped shield surrounding the portion of said capillary tube opposite said radiant means for protecting said tube against cooling by air currents.

14. The infrared heater of claim 1, together with:

a. a flue collar fixed to and extending through the upper side of said casing substantially at the middle of said first compartment; and b. an open ended arcuate member fixed to the exterior of said casing over said flue collar.

15. The heater of claim 14, together with:

a. second flue collar fixed to and extending through said arcuate member, said second flue collar being vertically aligned with the first flue collar; and b. a baffle fixed to the lower side of said arcuate member between the adjacent ends of said flue collars.

16. A fluid fuel-fired infrared heater, comprising:

a. an elongated casing including a housing of substantially uniform cross sectional configuration and a transverse partition dividing the interior of the housing into first and second compartments, one side of said casing being open;

b. an elongated infrared generator in and extending substantially the length of said first compartment, said infrared generator comprising a combustible mixture distribution tube, means extending the length of said tube for conducting the combustible mixture from said tube to a combustion zone adjacent the exterior of said distribution tube, and a radiant grid fixed to said distribution tube and adapted to be heated to incandescence by the heat liberated from the burning fuel-air mixture in said combustion zone, said radiant grid being oriented with its radiation emitting face facing the open side of said casing;

c. reflector means in said casing substantially surrounding the emitting portions of said radiant grid and adapted to direct the radiation emitted from the radiant grid through the open side of said casing, said reflector means being spaced from the walls of said reflector means and said casing and across said distribution tube; and d. a vent stack extending through the side of said casing opposite said open side and providing a passage for venting combustion products from said infrared generator.

17. The heater of claim 16, together with:

a. a fuel-air mixture supply conduit extending through said partition and supporting one end of said infrared generator; and b. bracket means fixing the other end of said infrared generator to said casing.

18. The heater of claim 16, together with:

a. fuel and air supply and mixing means and heater control means in said second compartment; and b. a heat shield in said first compartment between said reflector means and said partition for insulating the components in said second compartment from heat given off by said infrared generator.

19. The infrared generator of claim 16, together with a spark plug type igniter at one end of said distribution tube adjacent the external surface thereof.

20. In an infrared heater of the combustion type:

a. infrared generator means;

b. means including a combustion air blower for supplying a combustible fuel-air mixture to the infrared generator means; and c. means for varying the ratio of fuel to air in said mixture including:

d. a damper mounted in the outlet of said blower for movement between minimum and maximum flow positions;

e. a bimetallic element mounted in heat transfer relationship to said infrared generator means for movement between first and second positions as the temperature of the infrared generator means increases; and f. mechanical motion transmitting means connected between said bimetallic element and said damper for moving said damper from its minimum flow position toward its maximum flow position as the bimetallic element moves from its first to its second position, whereby the fuel to air ratio of the combustible mixture is high and the mixture easily ignitable when the heater is cold and the ratio of fuel to air lower to provide maximum combustion efficiency and complete combustion of said mixture when infrared generator means attains operating temperature.

21. An infrared heater, comprising:

a. a heater casing having an infrared generator compartment therein;

b. a pair of infrared generators mounted in said compartment in parallel, closely spaced, side-by-side relationship and extending from adjacent one end of the compartment to adjacent the other end thereof, each of said infrared generators including a fuel-air mixture distribution tube extending substantially the length of the generator and a radiant grid fixed to the lower side and extending substantially the length of each of said infrared generators; and c. reflectors fixed to each of said distribution tubes, each of said reflectors including first and second reflector members fixed to opposite sides of each of said distribution tubes, said first and second members having generally horizontal reflective portions extending substantially the length of said generators, said reflective portions being above and extending laterally beyond said radiant grids, the juxtaposed reflector members fixed to the distribution tubes of the two infrared generators being spaced apart to provide a passage for combustion products therebetween.

22. The heater of claim 21:

a. wherein the side of said casing facing said radiant grids is open; and b. including reflectors fixed to said casing in said burner compartment and extending substantially the length thereof, said reflectors having a lateral span from adjacent the open side of said casing to beyond the reflector members fixed to the infrared generator distribution tubes, said reflectors being spaced from the casing to provide a passage for cooling air therebetween and from the edges of the reflector members fixed to said infrared generators remote from the distribution tubes to which they are attached to provide passages for combustion products.

23. An infrared heater of the combustion type, comprising:
   a. a heater casing having an infrared generator compartment formed therein;
   b. an infrared generator in said compartment extending from adjacent one end of said compartment to adjacent the opposite end thereof;
   c. a combustible mixture supply conduit extending into said compartment through the one end thereof and supporting the end of the infrared generator thereadjacent;
   d. means for supporting the opposite end of said infrared generator from said casing, including:
   e. a hanger mounted in said compartment adjacent said opposite end thereof and means fixed to said hanger providing an aperture opening onto the side thereof facing said opposite compartment end; and
   f. an end plate on said generator having a mounting portion adapted to slidably extend into said aperture;
   g. said opposite compartment end having a service opening therein; and
   h. a removable closure member adapted to extend across said service opening, said closure member having a bracket fixed relative thereto engageable with said end plate to retain the mounting portion of said end plate in the cooperating aperture provided by the support means fixed to said hanger.

24. A fluid fuel-fired infrared heater, comprising:
   a. an elongated casing and a transverse partition dividing said casing into first and second compartments;
   b. at least one infrared generator in said first compartment; and
   c. combustible mixture supply means in said second compartment for supplying a controlled combustible mixture of fuel and air to said generator comprising a combustion air blower for supplying all of the air required for complete combustion of the fuel, said blower including air control means for reducing the amount of air supplied by the blower when the heater is cold and for increasing the amount of air delivered by said blower as the heater attains operating temperature;
   d. said generator including:
      (1) an elongated fuel-air mixture distribution tube for distributing said combustible mixture the length of said infrared generator and means for conducting said mixture from said tube to a combustion zone adjacent the exterior of said distribution tube and extending the length thereof;
      (2) a radiant member on the side of said combustion zone opposite said distribution tube adapted to be heated to incandescence by combustion of said mixture; and
      (3) ignition means energizable to ignite said mixture within said combustion zone; and
   e. said first compartment having an open side extending the length of said generator through which infrared radiation emitted therefrom can pass.

25. A fluid fuel-fired infrared heater, comprising:
   a. at least one infrared generator; and
   b. combustible mixture supply means for supplying a controlled combustible mixture of fuel and air to said generator comprising a combustion air blower for supplying all of the air required for complete combustion of the fuel, said blower including air control means for reducing the amount of air supplied by the blower when the heater is cold and for increasing the amount of air delivered by said blower as the heater attains operating temperature;
   c. said generator including:
      (1) an elongated fuel-air mixture distribution tube for distributing said combustible mixture the length of said infrared generator and means for conducting said mixture from said tube to a combustion zone adjacent the exterior of said distribution tube and extending the length thereof; and
      (2) a radiant member on the side of said combustion zone opposite said distribution tube adapted to be heated to incandescence by combustion of said mixture.

26. A fluid fuel-fired infrared heater, comprising:
   a. an elongated casing and a transverse partition dividing said casing into first and second compartments;
   b. at least one infrared generator in said first compartment;
   c. combustible mixture supply means in said second compartment for supplying a controlled combustible mixture of fuel and air to said generator;
   d. said generator including:
      (1) an elongated fuel-air mixture distribution tube for distributing said combustible mixture the length of said infrared generator and means for conducting said mixture from said tube to a combustion zone adjacent the exterior of said distribution tube and extending the length thereof;
      (2) a radiant member on the side of said combustion zone opposite said distribution tube adapted to be heated to incandescence by combustion of said mixture; and
      (3) ignition means energizable to ignite said mixture within said combustion zone;
   e. said combustible mixture supply means comprising:
      (1) a mixing chamber having two outlets, one of said outlets being connected to each of the two infrared generators;
      (2) a combustion air blower in fluid communication with the side of said mixing chamber opposite that in which said outlets are formed between the centers of the two outlets; and
      (3) a fuel supply conduit and an outlet manifold having two branches on opposite sides thereof fixed to the end of said conduit, said branches terminating in orifice spuds adapted to direct the fuel in two streams against opposite walls of said mixing chamber; and
   f. said first compartment having an open side extending the length of said generator through which infrared radiation emitted therefrom can pass.

27. A fluid fuel-fired infrared heater, comprising:
   a. an elongated casing having an opening in one end thereof;
   b. a partition extending across said casing dividing it into first and second compartments;
   c. infrared generator means in said first compartment, said infrared generator means having a fuel-air mixture distribution tube extending substantially the length of said compartment and having one end adjacent said partition;
   d. a fuel and combustion air mixing chamber in said second compartment;
   e. a combustible mixture supply conduit extending from said mixing chamber through said partition into the interior of said distribution tubes and slidably supporting one end of said infrared generator means from said partition;
   f. means slidably supporting the opposite end of said generator means in said casing; and
   g. closure means adapted to extend across the opening in said casing and fixedly position said generator means relative to said casing, said closure means being movable to an open position to permit said generator to be slidingly removed from said casing through the opening in the end thereof.

28. A fluid fuel-fired infrared heater, comprising:
   a. an elongated casing;
   b. a partition extending across said casing dividing it into first and second compartments;
   c. first and second infrared generators mounted sideby-side in said first compartment, said infrared generators each having a fuel-air mixture distribution tube extending substantially the length of said compartment and having one end adjacent said partition;
d. a single fuel and combustion air mixing chamber having first and second oppositely disposed side wall means in said second compartment;
e. independent combustible mixture supply conduits extending from said mixing chamber through said partition into the interiors of said distribution tubes, said combustible mixture supply conduits communicating with the interior of said mixing chamber through the first of said side wall means;
f. a combustion air blower in said second compartment with its outlet communicating with the interior of said mixing chamber through the second of said side wall means;
g. a fuel supply conduit extending into said mixing chamber; and
h. orifice means in said mixing chamber communicating with the fuel supply conduit and oriented to discharge fuel entering the mixing chamber through the fuel supply conduit into the stream of combustion air flowing into said mixing chamber from said combustion air blower.

References Cited by the Examiner
UNITED STATES PATENTS

| | | |
|---|---|---|
| 430,583 | 6/1890 | Hodgson et al. |
| 917,405 | 4/1909 | Bernhard _____ 158—118 X |
| 935,886 | 10/1909 | Bloomberg _____ 158—99 |
| 1,216,848 | 2/1917 | Schmidt. |
| 1,469,509 | 10/1923 | Grayson _____ 126—92 |
| 1,892,188 | 12/1932 | Goodridge. |
| 1,963,302 | 6/1934 | Hoff et al. _____ 313—118 |
| 2,183,099 | 12/1939 | Hagenbuch _____ 126—307 |
| 2,283,164 | 5/1942 | Brewster _____ 313—118 |
| 2,307,272 | 1/1943 | Houseman. |
| 2,331,950 | 10/1943 | Wood et al. _____ 126—92 |
| 2,487,775 | 11/1949 | Cartter _____ 126—91 |
| 2,759,472 | 8/1956 | Cartter. |
| 2,980,104 | 4/1961 | Patrick et al. _____ 158—113 X |
| 3,204,685 | 9/1965 | Patrick _____ 158—125 |

FOREIGN PATENTS

| | | |
|---|---|---|
| 842,596 | 7/1960 | Great Britain. |
| 845,525 | 8/1960 | Great Britain. |
| 862,050 | 3/1961 | Switzerland. |

OTHER REFERENCES

"Sun Heat," pamphlet, published by Perfection, 1135 Ivanhoe Road, Cleveland 10, Ohio, received in Group 380, Aug. 21, 1962, page 12 picture 3 relied on. Copy in 126—92 B.

Perfection Schwank Gas Infra-Red Heating Manual, published by Perfection, 1135 Ivanhoe Road, Cleveland 10, Ohio, copyrighted 1962, section V, page 2 relied on, copy in Group 380.

FREDERICK KETTERER, *Primary Examiner.*